(12) United States Patent
Murray et al.

(10) Patent No.: US 11,416,551 B2
(45) Date of Patent: *Aug. 16, 2022

(54) SYSTEM AND METHOD FOR AUTOMATED HYBRID SEQUENCING DATABASE GENERATION

(71) Applicant: Pearson Education, Inc., New York, NY (US)

(72) Inventors: William Murray, Lone Tree, CO (US); Alok Baikadi, Boulder, CO (US)

(73) Assignee: PEARSON EDUCATION, INC., New York, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/027,284

(22) Filed: Sep. 21, 2020

(65) Prior Publication Data

US 2021/0073292 A1 Mar. 11, 2021

Related U.S. Application Data

(63) Continuation of application No. 15/691,563, filed on Aug. 30, 2017, now Pat. No. 10,783,185.

(51) Int. Cl.
| | |
|---|---|
| *G06F 16/90* | (2019.01) |
| *G06N 20/00* | (2019.01) |
| *G06F 16/901* | (2019.01) |
| *G06F 16/2458* | (2019.01) |
| *G06N 5/02* | (2006.01) |
| *G06N 7/00* | (2006.01) |
| *G06N 5/00* | (2006.01) |

(52) U.S. Cl.
CPC ...... *G06F 16/9024* (2019.01); *G06F 16/2474* (2019.01); *G06N 5/022* (2013.01); *G06N 20/00* (2019.01); *G06N 5/003* (2013.01); *G06N 7/005* (2013.01)

(58) Field of Classification Search
CPC . G06F 16/9024; G06F 16/2474; G06N 20/00; G06N 5/022; G06N 5/003; G06N 7/005; G06Q 50/00
USPC ................................ 707/736, 741, 797, 798
See application file for complete search history.

(56) References Cited

U.S. PATENT DOCUMENTS

| | | | | |
|---|---|---|---|---|
| 7,373,586 B2 * | 5/2008 | Abe | ...... | G06F 40/194 |
| | | | | 715/255 |
| 7,437,664 B2 * | 10/2008 | Borson | ...... | G06F 40/194 |
| | | | | 715/209 |

(Continued)

*Primary Examiner* — Hares Jami
(74) *Attorney, Agent, or Firm* — Quarles & Brady LLP

(57) ABSTRACT

Systems and methods for automated sequencing database generation are disclosed herein. The system can include memory that can include a content library database; a graph database; and a model database. The system can include a user device and at least one server. The at least one server can: receive a content aggregation from the content library database; identify content components of the content aggregation based on a natural language processing analysis of at least a portion of the content aggregation; identify explicit sequencing of the content components; generate an intermediate content graph based on the explicit sequencing of the content components; generate a final content graph from the intermediate content graph based on implicit sequencing of the content components; and store the final content graph within the graph database.

20 Claims, 14 Drawing Sheets

(56) References Cited

U.S. PATENT DOCUMENTS

| | | | |
|---|---|---|---|
| 2010/0309933 A1* | 12/2010 | Stark | G06F 16/2246 370/503 |
| 2013/0262365 A1* | 10/2013 | Dolbear | G06N 5/02 706/50 |
| 2014/0372458 A1* | 12/2014 | Jurca | G06F 16/9024 707/754 |
| 2017/0364534 A1* | 12/2017 | Zhang | G06F 16/284 |
| 2019/0012405 A1* | 1/2019 | Contractor | G06F 16/248 |

* cited by examiner

SYSTEM AND METHOD FOR AUTOMATED HYBRID SEQUENCING DATABASE GENERATION

CROSS-REFERENCE TO RELATED APPLICATIONS

This present application is a continuation of U.S. Non-Provisional application Ser. No. 15/691,563 filed Aug. 30, 2017, now U.S. Pat. No. 10,783,185, and entitled SYSTEM AND METHOD FOR AUTOMATED HYBRID SEQUENCING DATABASE GENERATION; the entire contents of which are incorporated herein by reference.

BACKGROUND

A computer network or data network is a telecommunications network that allows computers to exchange data. In computer networks, networked computing devices exchange data with each other along network links (data connections). The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology, and organizational intent. In most cases, communications protocols are layered on (i.e. work using) other more specific or more general communications protocols, except for the physical layer that directly deals with the transmission media.

Notifications can be sent through a computer network. These notifications can be electronic notifications and can be received via e-mail, phone, text message, or fax. Notifications have many applications for businesses, governments, schools, and individuals.

BRIEF SUMMARY

One aspect of the present disclosure relates to a system for automated sequencing database generation. The system includes a memory. The memory can include: a content library database including at least one content aggregation for presentation to a user; a graph database containing at least one intermediate content graph and at least one final content graph; and a model database including at least one statistical model. In some embodiments, each of the intermediate and final content graphs identify and link portions of the content aggregation. The system can include a user device and at least one server. The at least one server can: receive a content aggregation from the content library database; identify content components of the content aggregation based on a natural language processing analysis of at least a portion of the content aggregation; identify explicit sequencing of the content components; generate an intermediate content graph based on the explicit sequencing of the content components; generate a final content graph from the intermediate content graph based on implicit sequencing of the content components; and store the final content graph within the graph database.

In some embodiments, identifying the content components includes: identifying metadata associated with the content aggregation; parsing the identified metadata; and identifying topics via terminology extraction performed on the parsed metadata. In some embodiments, each topic is uniquely associated with a content component. In some embodiments, identifying explicit sequencing of the content components includes extracting explicit sequencing data contained within metadata associated with the content aggregation. In some embodiments, the metadata associated with the content aggregation includes front matter of the content aggregation.

In some embodiments, the intermediate content graph includes a plurality of nodes associated with the content components and edges. In some embodiments, each of the edges links a pair of nodes from the plurality of nodes in a hierarchical and/or sequential relationship. In some embodiments, each of the content components is associated with a unique one of the plurality of nodes.

In some embodiments, the at least one server can further identify an implicit sequencing of the content aggregation. In some embodiments, generating the final content graph includes modifying at least one of the edges of the intermediate content graph according to the implicit sequencing. In some embodiments, modifying at least one of the edges of the intermediate content graph includes at least one of: deleting a node; adding a node; changing directionality of an edge; adding an edge; and removing an edge.

In some embodiments, identifying the implicit sequencing of the content aggregation includes: inferring skills associated with the content components; extracting implicit sequencing evidence from the content aggregation; inputting the implicit sequencing evidence into the at least one statistical model; and generating a sequence of the skills associated with the content components based on an output of the statistical model. In some embodiments, the implicit sequencing evidence is extracted via natural language processing from second metadata associated with the content aggregation. In some embodiments, the second metadata includes back matter. In some embodiments, the implicit sequencing of the content aggregation is identified via application of Relational Machine Learning to implicit sequencing evidence extracted from the content aggregation.

One aspect of the present disclosure relates to a method for automated sequencing database generation. The method includes: receiving a content aggregation from a content library database at at least one server; identifying content components of the content aggregation from a natural language processing analysis of at least a portion of the content aggregation; identifying an explicit sequencing of the content components; generating an intermediate content graph based on the explicit sequencing of the content components; generating a final content graph from the intermediate content graph according to an implicit sequencing of the content components; and storing the final content graph within a graph database.

In some embodiments, identifying the content components includes: identifying metadata associated with the content aggregation; parsing the identified metadata; and identifying topics via terminology extraction performed on the parsed metadata. In some embodiments, each topic is uniquely associated with a content component. In some embodiments, identifying explicit sequencing of the content components includes extracting explicit sequencing data contained within metadata associated with the content aggregation. In some embodiments, the metadata associated with the content aggregation includes front matter of the content aggregation.

In some embodiments, the intermediate content graph includes a plurality of nodes associated with the content components and edges. In some embodiments, each of the edges links a pair of nodes from the plurality of nodes in a hierarchical and/or sequential relationship. In some embodiments, each of the content components is associated with a unique one of the plurality of nodes.

In some embodiments, generating the final content graph includes: identifying the implicit sequencing of the content aggregation; and modifying at least one of the edges of the intermediate content graph according to the implicit sequencing. In some embodiments, modifying at least one of the edges of the intermediate content graph includes at least one of: deleting a node; adding a node; changing directionality of an edge; adding an edge; and removing an edge. In some embodiments, identifying the implicit sequencing of the content aggregation includes: inferring skills associated with the content components; extracting implicit sequencing evidence from the content aggregation; inputting the implicit sequencing evidence into at least one statistical model; and generating a sequence of the skills associated with the content components based on an output of the at least one statistical model. In some embodiments, the implicit sequencing of the content aggregation is identified via application of Relational Machine Learning to implicit sequencing evidence extracted from the content aggregation.

One aspect of the present disclosure relates to a system for generating a hybrid knowledge graph database. The system includes memory including: a content library database including at least one content aggregation for presentation to a user; a graph database containing at least one intermediate content graph and at least one final content graph; and a model database including at least one statistical model. In some embodiments, each of the intermediate and final content graphs identify and link portions of the content aggregation. The system can include a user device and at least one server. The at least one server can: receive a first content graph and a second content graph; and automatically align the first content graph and the second content graph according to a machine learning algorithm. In some embodiments, aligning the first content graph and the second content graph includes: identifying first nodes within the first content graph and second nodes within the second content graph; identifying matching nodes between the first and second content graphs; and identifying nodes contained in one of the first and second content graphs and missing in the other of the first and second content graphs. The at least one server can: generate a hybrid content graph based on the aligned first and second content graphs; and store the hybrid content graph in the graph database.

In some embodiments, the hybrid content graph can include a plurality of nodes associated with content components and edges. In some embodiments, each of the edges links a pair of nodes from the plurality of nodes in a hierarchical and/or sequential relationship. In some embodiments, the plurality of nodes in the hybrid content graph can include the matching nodes and at least some of the nodes contained in one of the first and second content graphs and missing in the other of the first and second content graphs. In some embodiments, generating the hybrid content graph includes determining the hierarchical and/or sequential relationship between nodes in each of the first and second content graphs and generating hybrid hierarchical and/or sequential relationships between the nodes in the hybrid content graph.

In some embodiments, at least some of the hybrid hierarchical and/or sequential relationships between the nodes in the hybrid content graph are different than the hierarchical and/or sequential relationship between corresponding nodes in one or both of the first and second content graphs. In some embodiments, aligning the first content graph and the second content graph includes analyzing nodes in the first and second content graphs and content associated with those nodes.

In some embodiments, the nodes and content associated with the nodes of the first and second content graphs are analyzed according to a natural language processing algorithm. In some embodiments, content associated with the nodes of the first and second content graphs includes front matter. In some embodiments, the hybrid hierarchical and/or sequential relationships between the nodes in the hybrid content graph are generated according to a combination of an explicit sequencing and an implicit sequencing of content associated with each of the first content graph and the second content graph.

In some embodiments, aligning the first content graph and the second content graph according to a machine learning algorithm includes: extracting features from content associated with each of the nodes of the first and second content graphs; inputting the extracted features into a machine learning model; and receiving an output from the machine learning model identifying matching nodes between the first and the second content graphs. In some embodiments, aligning the first content graph and the second content graph according to a machine learning algorithm further includes: identifying hierarchical and/or sequential relationships between the identified matching nodes. In some embodiments, the hierarchical and/or sequential relationships between the identified matching nodes are identified via a Relational Machine Learning analysis.

One aspect of the present disclosure relates to a method for generating a hybrid knowledge graph database. The method includes: receiving at at least one server a first content graph and a second content graph; and automatically aligning with the at least one server the first content graph and the second content graph according to a machine learning algorithm. In some embodiments, aligning the first content graph and the second content graph includes: identifying first nodes within the first content graph and second nodes within the second content graph; identifying matching nodes between the first and second content graphs; and identifying nodes contained in one of the first and second content graphs and missing in the other of the first and second content graphs. The method can include: generating with the at least one server a hybrid content graph based on the aligned first and second content graphs; and storing with the at least one server the hybrid content graph in the graph database.

In some embodiments, the hybrid content graph can include a plurality of nodes associated with the content components and edges. In some embodiments, each of the edges links a pair of nodes from the plurality of nodes in a hierarchical and/or sequential relationship. In some embodiments, the plurality of nodes in the hybrid content graph can include the matching nodes and at least some of the nodes contained in one of the first and second content graphs and missing in the other of the first and second content graphs. In some embodiments, generating the hybrid content graph includes determining the hierarchical and/or sequential relationship between nodes in each of the first and second content graphs and generating hybrid hierarchical and/or sequential relationships between the nodes in the hybrid content graph. In some embodiments, at least some of the hybrid hierarchical and/or sequential relationships between the nodes in the hybrid content graph are different than the hierarchical and/or sequential relationship between corresponding nodes in one or both of the first and second content graphs.

In some embodiments, aligning the first content graph and the second content graph includes analyzing nodes in the first and second content graphs and content associated with those nodes according to a natural language processing algorithm. In some embodiments, wherein aligning the first content graph and the second content graph according to a machine learning algorithm includes: extracting features from content associated with each of the nodes of the first and second content graphs; inputting the extracted features into a machine learning model; and receiving an output from the machine learning model identifying matching nodes between the first and the second content graphs. In some embodiments, aligning the first content graph and the second content graph according to a machine learning algorithm further includes: identifying hierarchical and/or sequential relationships between the identified matching nodes, wherein the hierarchical and/or sequential relationships between the identified matching nodes are identified via a Relational Machine Learning analysis.

One aspect of the present disclosure relates to a system for automated content delivery via a hybrid content graph. The system includes a memory including: a content library database including at least one content aggregation for presentation to a user; a graph database containing at least one intermediate content graph and at least one final content graph; and a model database including at least one statistical model. In some embodiments, each of the intermediate and final content graphs identify and link portions of the content aggregation. The system can include a user device; and at least one server. The at least one server can: receive a first content aggregation and a second content aggregation; generate a first content graph identifying skills and hierarchical and/or sequential relationships between the skills from the first content aggregation via application of a machine learning algorithm to features generated from portions of the first content aggregation; generate a second content graph identifying skills and hierarchical and/or sequential relationships between the skills from the second content aggregation via application of a machine learning algorithm to features generated from portions of the second content aggregation; generate a hybrid content graph via aligning of the first and second content graphs; determine a node corresponding to a user position in the hybrid content graph; retrieve edge information identifying nodes linked to the node corresponding to a user position in the hybrid content graph; select one of the identified nodes linked to the node corresponding to the user position in the hybrid content graph; and automatically deliver content associated with the selected one of the identified nodes to the user.

In some embodiments, generating the first content graph includes extracting features from the first content aggregation to identify content components of the first content aggregation and to determine a sequencing of the content components of the first content aggregation. In some embodiments, determining the sequencing of the content components of the first content aggregation includes identifying an explicit sequencing of the first content aggregation and an implicit sequencing of the first content aggregation. In some embodiments, the implicit sequencing of the first content aggregation is identified via application of Relational Machine Learning to implicit sequencing evidence extracted from the first content aggregation.

In some embodiments, determining the sequencing of the content components of the first content aggregation further includes generating edges linking the skills in the first content graph in hierarchical and/or sequential relationships according to a combination of the explicit sequencing and the implicit sequencing. In some embodiments, the first content graph and the second content graph are aligned according to a machine learning algorithm. In some embodiments, aligning the first and second content graphs includes: identifying first nodes within the first content graph and second nodes within the second content graph; identifying matching nodes between the first and second content graphs; and identifying nodes contained in one of the first and second content graphs and missing in the other of the first and second content graphs.

In some embodiments, aligning the first content graph and the second content graph further includes: extracting features from content associated with each of the nodes of the first and second content graphs; inputting the extracted features into a machine learning model; and receiving an output from the machine learning model identifying matching nodes between the first and the second content graphs. In some embodiments, aligning the first content graph and the second content graph further includes: identifying hierarchical and/or sequential relationships between the identified matching nodes. In some embodiments, the hierarchical and/or sequential relationships between the identified matching nodes are identified via a Relational Machine Learning analysis. In some embodiments, selecting one of the identified nodes linked to the node corresponding to the user position in the hybrid content graph further includes retrieving edge information identifying child nodes linked to the node corresponding to the user position in the hybrid content graph.

One aspect of the present disclosure relates to a method for automated content delivery via a hybrid content graph. The method includes: receiving a first content aggregation and a second content aggregation; generating a first content graph identifying skills and hierarchical and/or sequential relationships between the skills from the first content aggregation via application of a machine learning algorithm to features generated from portions of the first content aggregation; generating a second content graph identifying skills and hierarchical and/or sequential relationships between the skills from the second content aggregation via application of a machine learning algorithm to features generated from portions of the second content aggregation; generating a hybrid content graph via aligning of the first and second content graphs; determining a node corresponding to a user position in the hybrid content graph; retrieving edge information identifying nodes linked to the node corresponding to a user position in the hybrid content graph; selecting one of the identified nodes linked to the node corresponding to the user position in the hybrid content graph; and automatically delivering content associated with the selected one of the identified nodes to the user.

In some embodiments, generating the first content graph includes extracting features from the first content aggregation to identify content components of the first content aggregation and to determine a sequencing of the content components of the first content aggregation. In some embodiments, determining the sequencing of the content components of the first content aggregation includes identifying an explicit sequencing of the first content aggregation and an implicit sequencing of the first content aggregation. In some embodiments, the implicit sequencing of the first content aggregation is identified via application of Relational Machine Learning to implicit sequencing evidence extracted from the first content aggregation.

In some embodiments, determining the sequencing of the content components of the first content aggregation further includes generating edges linking the skills in the first content graph in hierarchical and/or sequential relationships according to a combination of the explicit sequencing and the implicit sequencing. In some embodiments, the first content graph and the second content graph are aligned according to a machine learning algorithm. In some embodiments, aligning the first and second content graphs includes: identifying first nodes within the first content graph and second nodes within the second content graph; identifying matching nodes between the first and second content graphs; and identifying nodes contained in one of the first and second content graphs and missing in the other of the first and second content graphs.

In some embodiments, aligning the first content graph and the second content graph further includes: extracting features from content associated with each of the nodes of the first and second content graphs; inputting the extracted features into a machine learning model; and receiving an output from the machine learning model identifying matching nodes between the first and the second content graphs. In some embodiments, aligning the first content graph and the second content graph further includes: identifying hierarchical and/or sequential relationships between the identified matching nodes. In some embodiments, the hierarchical and/or sequential relationships between the identified matching nodes are identified via a Relational Machine Learning analysis. In some embodiments, selecting one of the identified nodes linked to the node corresponding to the user position in the hybrid content graph further includes retrieving edge information identifying child nodes linked to the node corresponding to the user position in the hybrid content graph.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability, or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
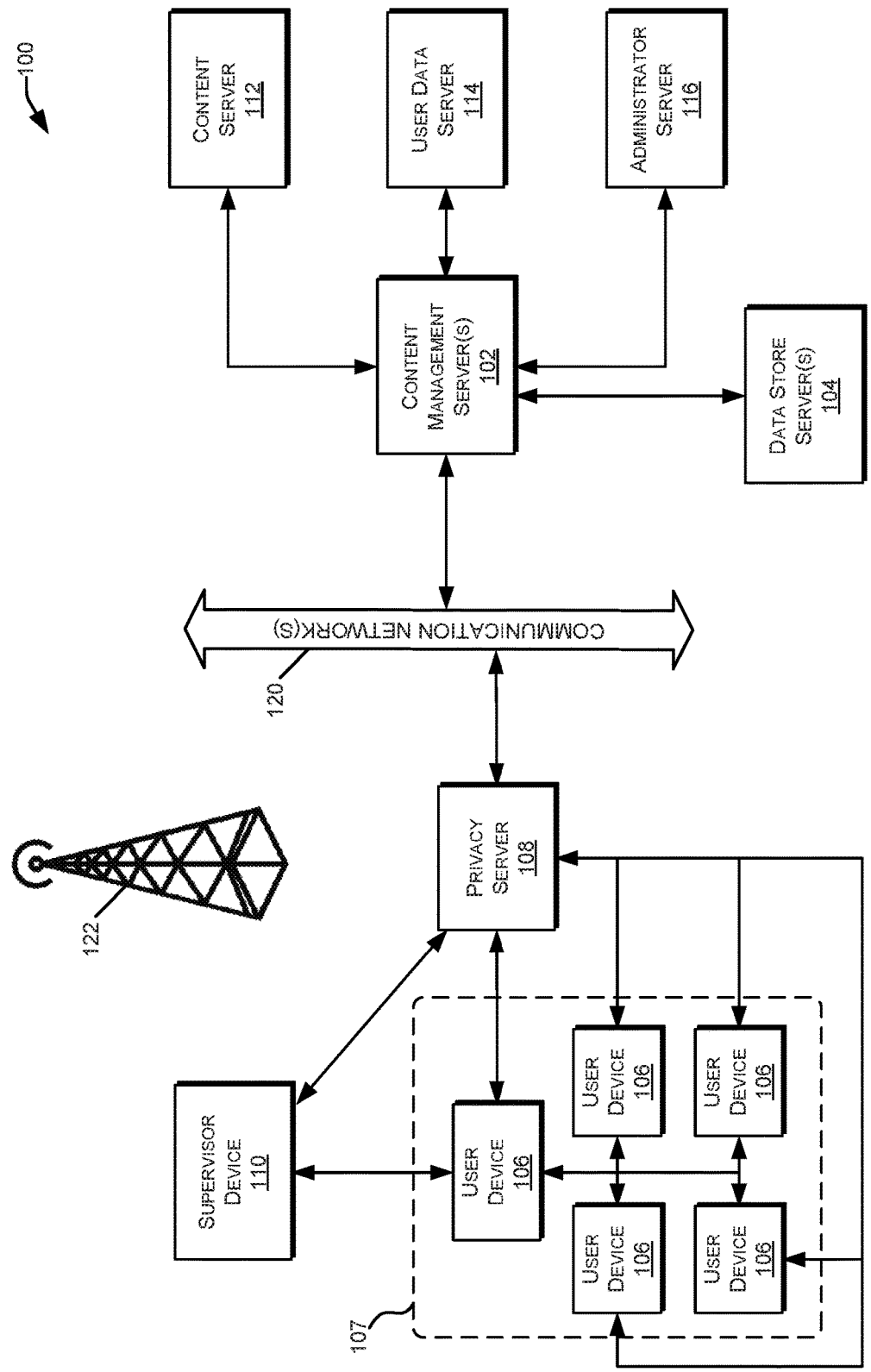
FIG. 1 is a block diagram illustrating an example of a content distribution network.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, virtual reality devices such as, for example, virtual reality headsets, augmented reality devices such as, for example, augmented reality headset, and wearable computing devices. In some embodiments, the user device 106 can be any device that includes, for example, a camera, a speaker, a screen or display, and a microphone. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include one or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
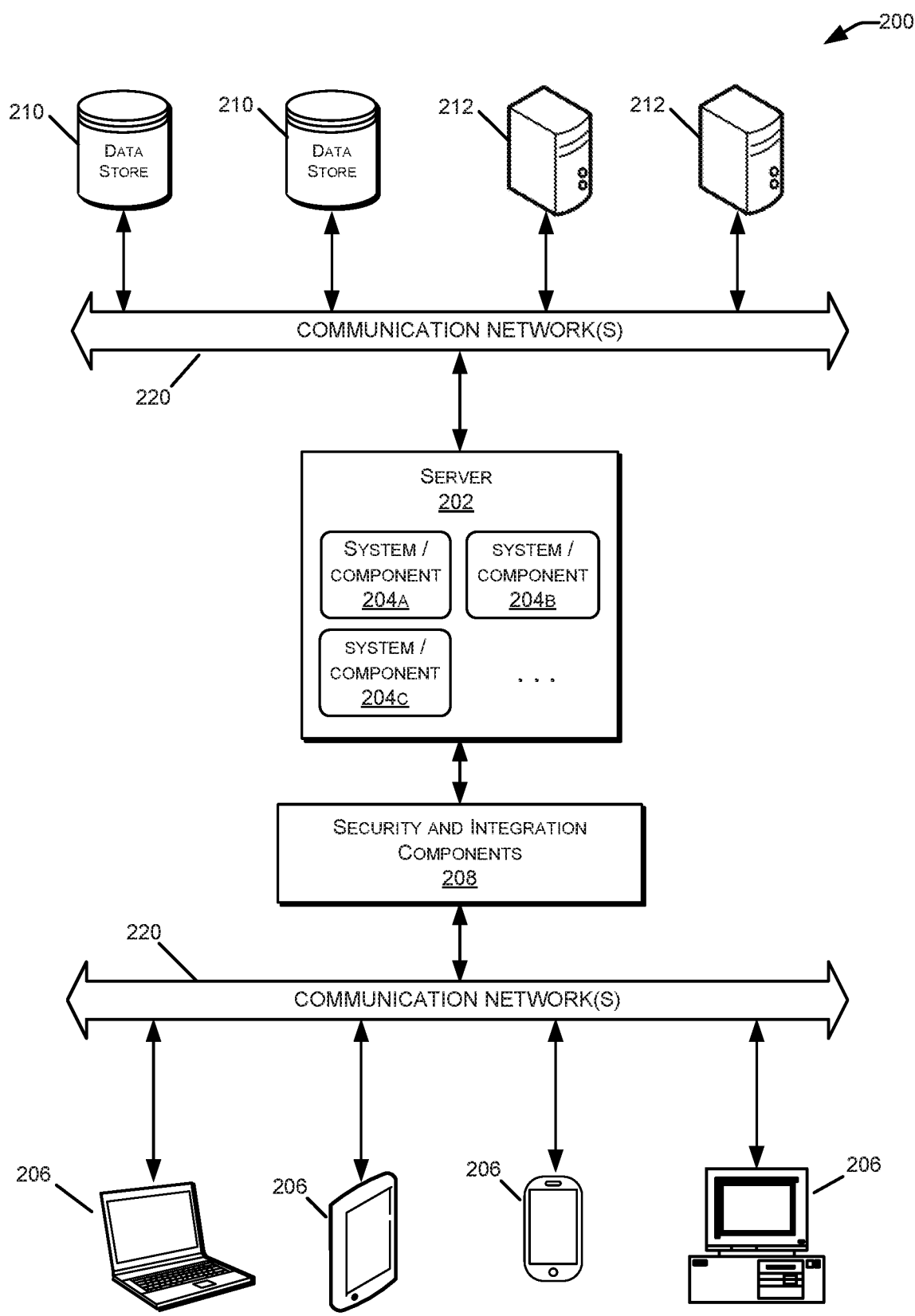
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of the same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML, encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
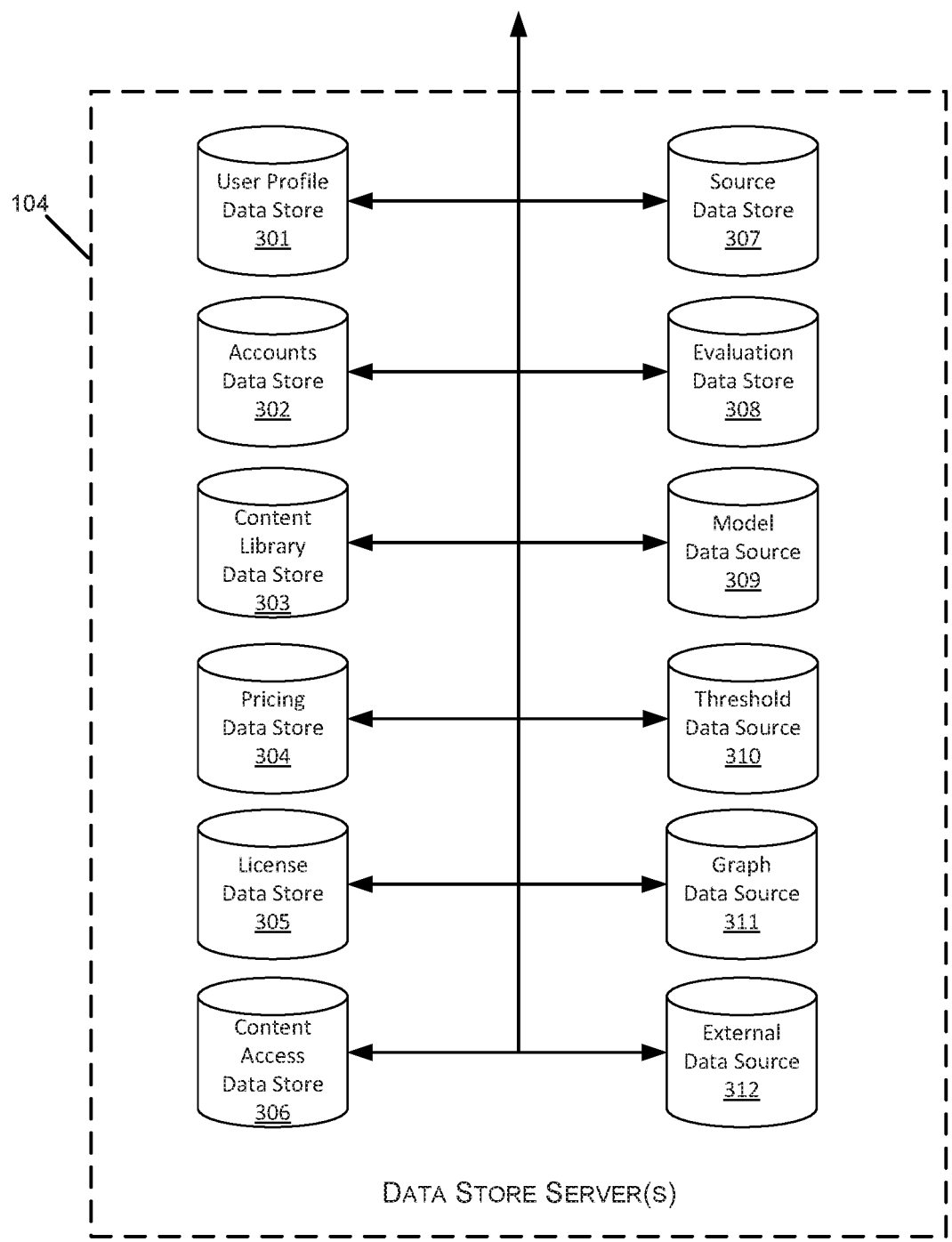
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information, also referred to herein as user metadata, relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, the user metadata can identify, for example, a user skill level, a user cognitive level, assets previously presented to the user, activities previously performed by the user, virtual environment preferences, or one or several physical attributes of the user. In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user, may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

In some embodiments, the user profile database 301 can include an interaction sub-database that can store information relating to one or several user interactions with the CDN 100, and specifically relating to one or several user interactions with a user experience created by the CDN 100 and more specifically with a virtual world containing virtual assets created by the CDN 100. In some embodiments, this interaction database can be further subdivided to contain a speech database, a manipulation database, and a grouping database. The speech database can contain information identifying verbal interactions between the user and the CDN 100. These can include, for example, one or several user comments, questions, responses or the like, and one or several questions, responses, comments, or the like posed or provided by the CDN 100. In some embodiments, the speech database can include information relating to the evaluation of speech or speech interactions.

The manipulation database can include information relating to one or several manipulations of assets within the virtual world by, for example, the user. In some embodiments, the user can interact with one or several assets such as, for example, to change the size of the asset either by enlarging or shrinking the asset, to open the asset, to see inside the asset, or the like.

The grouping database can include information relating to a user grouping of one or more of the assets. In some embodiments, for example, the user can group one or several of the assets into one or several groups. The grouping database can include information identifying assets in these one or several groupings, information related to the reason for the grouping and/or the predicted reason for the grouping, and/or information relating to an evaluation of the grouping.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to form an object network. In some embodiments, these data packets can be linked in the object network according to one or several prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library database 303 can include a plurality of content components. The content components can, in some embodiments, comprise one or several tasks, questions, activities, or the like that can be combined together to create a single piece of content, also referred to herein as a content aggregation or form, such as, for example, a single assignment, quiz, test, or evaluation. The content aggregation can comprise digital content, and specifically a group of digital content such as, for example, one or several web-pages, one or several e-books, one or several digitized books, one or several videos, one or several audio files, or the like. In some embodiments, the content aggregation can comprise pedagogical content. The content aggregation can be associated with metadata which can characterize aspects of content forming the content aggregation. This metadata can include front matter and/or back matter. The front matter can include, for example, a table of contents, a preface, a title page, or the like. The back matter can include, for example, an appendix, a glossary, an index, or the like.

In some embodiments, some or all of the information stored in the content library database 303 can be generated from user interaction with the content of the single components. In some embodiments, this information can, for example, characterize a reliability of the single item, a difficulty of the single item, a differentiation of the single item, one or several averages of the single item, one or several standard deviations of the single item, or the like. In some embodiments, the differentiation of the single item can characterize the degree to which correctly or incorrectly responding to the item delineates between skill levels, attribute levels, or the like. In some embodiments, information associated with single items can be used to determine a reliability of a combination of multiple items.

In some embodiments, the content library database 303 can comprise one or several forms that can each include a plurality content components. In some embodiments, these forms can be created by a user of the CDN 100 from the content components stored in the content library database 303. In some embodiments, some or all of these one or several forms can be characterized by, for example, one or several scores or statistical measures. These scores or statistical measures can include a reliability coefficient such as, for example, a Cronbach's a, an error score or value such as, for example, a standard error of measurement (SEM) score, or the like. In some embodiments, one or several of these scores can be calculated based on the information associated with each of the content components. In some embodiments, these one or several scores of the form can be calculated in real-time and in some embodiments, one or several scores for alternative forms can be calculated to allow the recommendation of one or several content components for inclusion in the form and/or for removal from the form. In some embodiments, these one or several scores can vary based on one or several attributes of the intended recipient and/or recipients of the form. These one or several attributes can include, for example, gender, age, education, intelligence, or the like.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as, a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network also referred to herein as a content network or content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets that can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and in some embodiments, these databases of content aggregations can further include content aggregations selected for inclusion by their specific user and/or a supervisor of that specific user. In some embodiments, these content aggregations can be arranged and/or linked in a hierarchical relationship and/or sequential relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships and/or sequential relationships embodied in the object network. In some embodiments, the content aggregation network, and/or the content aggregations forming the content aggregation network can be organized according to one or several tasks identified in the syllabus, schedule or the like.

In some embodiments, the content library database 303 can include sub databases containing content generated by one or several users including, for example, a content database and/or a comment database. In some embodiments, for example, content can be associated with a group of users such as a group of users in a course, a class, a training group, or the like, which users can include, one or several students, trainees, or the like. In some embodiments, this group of users can further include one or several teachers, trainers, professors, or the like. This content can be generated by one of the users or can be generated by a source other than one of the users. This content can, in some embodiments, comprise a plurality of pieces of content each of which pieces of content can be generated by one or several of the users. In some embodiments such as when the group of users is in a course, each of the pieces of content can be generated by one or several users as part of an assignment, a test, a quiz, or the like. The content can comprise the video file, and audio file, text file, and image file, or the like.

The comment database can comprise comments relating to one or several of the pieces of content in the content database. The comments can be generated by one or several of the users. The comment database can be, in some embodiments, independent of the content database such that a change to the comment database does not change the content database. Similarly, in some embodiments, the comment database is independent of the content database such that a change to the content database does not change the comment database. In such embodiments, the comment database can include one or several pointers associated with entries in the comment database linking those entries to pieces of content in the content database. The Scott comments stored in the comment database as entries can be linked to the appropriate one of the pieces of content in the content database via the one or several pointers. In some embodiments, each entry in the content database can include information identifying the one or several pieces of content associated with the entry, comment content, data identifying one or several evaluation criteria or evaluation metrics associated with the content, or the like.

The content library database 303 can comprise a plurality of assets, asset information associated with assets forming the plurality of assets, and asset manipulation data. In some embodiments, an asset can comprise virtual representation of anything including, for example, an object, an item, a person, an animal, a plant, an organism, an event, an artifact such as a historic artifact, or the like. In some embodiments, some or all of the assets can be grouped into one or several activities or exercises. The assets stored in the content library database 303 can comprise the computer code or instructions for generating the virtual asset within a user experience.

The asset information can identify one or several traits or attributes of the assets. These can include, for example, a name, a size, a color, a significance, a use, a location of creation, a cultural significance, an era of creation, composition, one or several significant achievements, or the like. In some embodiments, these one or several traits or attributes can be organized in a hierarchy from simplest to most complex trait or attribute. Thus, in some embodiments, a color, shape, name, or size can be examples of simple attributes, whereas, a cultural significance and one or several significant achievements can be examples of complex traits or attributes.

The asset manipulation data, also referred to herein as manipulation data, can identify possible manipulations of the asset. These can include, for example, enlarging the asset, viewing inside of the asset, opening the asset, or the like. In some embodiments, the content library database 303 can be comprise one or several sub-databases such as, for example, an asset sub-database, an asset information sub-database containing the asset information, and an asset manipulation sub-database containing the asset manipulation data.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In some embodiments, the evaluation database 308 can comprise a sub database identified herein as the evaluation metric database. In some embodiments, the evaluation metric database can identify one or several criteria, metrics, rubrics, or the like for use in evaluating one or several of the one or several pieces of content in the content database. In some embodiments, the one or several metrics can each define one or several metric subcomponents and provide information for generating one or several values characterizing each of those one or several metric subcomponents. In some embodiments, the evaluation metric database can be independent of one or both of the content database and the comment database. In some embodiments, some or all of the entries in the comment database can be linked to one or several of the metrics, rubrics, criteria, or the like in the evaluation metric database. In one embodiment, for example, each entry in the comment database can be linked to a metric in the evaluation metric database, and specifically each entry in the comment database can be linked to one or several of the metric subcomponents within one of the metrics in the evaluation database. In some embodiments, this link can identify one or several metric subcomponents relevant to the comment.

In some embodiments, each metric in the evaluation metric database can be associated with metric metadata. This metric metadata can identify information relevant to the metric such as, for example, the course or section associated with the metric, the teacher associated with the metric, the assignment associated with the metric, or the like. The metric metadata can be stored in the evaluation metric database and can be linked to its associated metric(s).

A model data store 309, also referred to herein as a model database 309, can store information relating to one or several predictive models. These predictive models can include one or several predictive models for predicting and/or identifying a skill or topic of one or several pieces of content, one or several predictive models for identifying relationships between nodes in a content graph and/or between pieces of content, or the like. In some embodiments, the model database can comprise one or several models that can, upon input of one or several features and/or parameters from a response, generate an evaluation value for that response. In some embodiments, these can include one or several evaluation models, evidence models, risk models, skill models, or the like. In some embodiments, the model can be a mathematically-based statistical model. The model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failing to correctly respond to one or several data packets, failure to achieve a desired level of completion of a program, for example, in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example, a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion statuses can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

In some embodiments, the evaluation model can comprise a statistical model that can generate an evaluation value based on information relating to a received response. In some embodiments, this information can include one or several features identified in the received response, which one or several features can be used to generate one or several parameters. These parameters can be input into the evaluation model, which can be an Artificial Intelligence (AI) model that can include a machine learning model such as, for example, a Bayesian network, a support vector machine, a Random forest model, a decision tree model, a classifier, a regression-based model or the like.

In some embodiments, the model database 309 can comprise a correlation database, which correlation database can comprise a sub-database of the model database. The correlation database can include evaluation range data, which can divide one or several sets of potential evaluation values into one or several groups or ranges. In some embodiments, the correlation database can further include one or several elevated evaluation protocols and/or information pertaining to the same. In some embodiments, these one or several elevated evaluation protocols can identify one or several actions, steps, evaluators, models, or the like for implementation when an elevated evaluation is indicated.

In some embodiments, the model database 309 can comprise one or several sub-databases of training data. This training data can be used in training a model. In some embodiments, the training data can comprise, for example, a plurality of responses and an evaluation for each of the plurality of responses.

The model database 309 can include one or several machine learning models including, for example, a machine learning language model, a prediction model, and/or an evaluation model. The machine learning language model, also referred to herein as a speech model, can comprise a machine learning algorithm or classifier that is trained to receive an identifier of an asset and one or several keywords from one or several questions directed to that asset and to identify and/or predict appropriate response data to those one or several questions. In some embodiments, the speech model can comprise a plurality of speech models such that each asset is associated with its own speech model, or a single speech model can be applicable to a plurality of assets. In some embodiments, the speech model can be linked with the object database 303, and specifically with the asset attribute sub-database in the object database.

The model database 309 can include the prediction model. In some embodiments, the prediction model can predict a reason for a grouping of one or several assets. The prediction model, which can comprise a regression model, can, in some embodiments, predict the reason for a grouping of one or several assets based on the attributes and/or traits of those one or several assets and/or one or several attributes of the user forming the grouping. In some embodiments, for example, identification of assets in a grouping can be provided to the prediction model. The prediction model can then, based on, for example, attributes of the assets, identify a prediction of a reason for the grouping, which prediction can be associated with a value indicative of the probability of the predicted grouping reason being the actual grouping reason. In some embodiments, the prediction model can be influenced by one or several attributes of the user forming the grouping, such as, for example, past reasons for groupings created by that user, the cognitive level of reasons for grouping created by that user, or the like.

The model database 309 can include the evaluation model. In some embodiments, the evaluation model can evaluate the reason for the grouping of the one or several assets. Specifically, the evaluation model can evaluate one or both of the predicted reason for the grouping of the one or several assets, and the actual reason for the grouping of one or several assets. The evaluation model can comprise a machine learning algorithm or classifier that is trained to receive one or several keywords of the reason for grouping along with one or several attributes of the user creating the grouping and identify a cognitive level of the grouping. In some embodiments, this can include identifying a level within a taxonomy such as Bloom's taxonomy corresponding to the cognitive level or difficulty level associated with the reason for the grouping.

A threshold database 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

A graph database 311 can include one or several content graphs. These can include, for example, one or several intermediate content graphs and/or one or several final content graphs. The content graphs can include one or several nodes that are interconnected via one or several edges such that each edge connects a pair of nodes in, for example, a hierarchical relationship identifying one of the nodes in the pair as a prerequisite node, also referred to herein as a parent node, to the other of the nodes, also referred to herein as a child node, in the pair. In some embodiments, some or all of the edges can connect the nodes in pairs according to a sequential relationships. In some embodiments, the hierarchical relationship may be the same as the sequential relationships, and in some embodiments, the hierarchical relationships may be different than the sequential relationships. In one embodiment, for example, in which a chapter contains a number of subsections, nodes representing each of the subsections would be connected in a hierarchical relationship with a node representing the chapter. However, the node representing the chapter would only be connected with the node at which a learner should start in a sequential relationship, and the nodes representing the subsections would be connected in sequential relationships according to the order in which the learner should progress through the content.

In some embodiments, a subset of the edges can identify one or several preferred paths through the content of the content aggregation. In some embodiments, for example, a single parent node can be connected to a plurality of child nodes. Some or all of the child nodes can be interconnected to identify a hierarchical relationship and/or sequential relationship between the child nodes. In such an embodiments, there may be multiple paths through the content graph of the content aggregation. In such an embodiment each edge can be associated with one or several attributes or values identifying the edge as either forming a preferred path through the content of the content aggregation or as not forming a preferred path through the content of the content aggregation. In an embodiment in which a parent nodes is directly connected to a pair of child nodes, one of which child nodes is a prerequisite to the other, the edge connecting the parent node to the one of the child nodes that is a prerequisite to the other can include or be associated with an attribute or value indicating this edge as a preferred path and the edge connecting the parent node to the one of the child nodes that is not a prerequisite to the other can include or be associated with an attribute or valued indicating this as a non-preferred path.

Each of the nodes in each content graph in the graph database 311 can be associated with a content component of the content aggregation to which the content graph relates. In some embodiments, the content components can include text, video, audio, images, or the like. In some embodiments, the nodes can be further associated with a skill relevant to associated content of the content aggregation.

In some embodiments, for example, an intermediate content graph can be generated based on explicit sequencing information associated with a content aggregation, which explicit sequencing information can be extracted from metadata associated with the content aggregation and specifically can be extracted from the front matter of the content aggregation.

In addition to the illustrative data stores described above, data store server(s) 104 (e.g., database servers, file-based storage servers, etc.) may include one or more external data aggregators 311. External data aggregators 311 may include third party data sources accessible to the content management network 100, but not maintained by the content management network 100. External data aggregators 311 may include any electronic information source relating to the users, content resources, or applications of the content distribution network 100. For example, external data aggregators 311 may be third party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4:
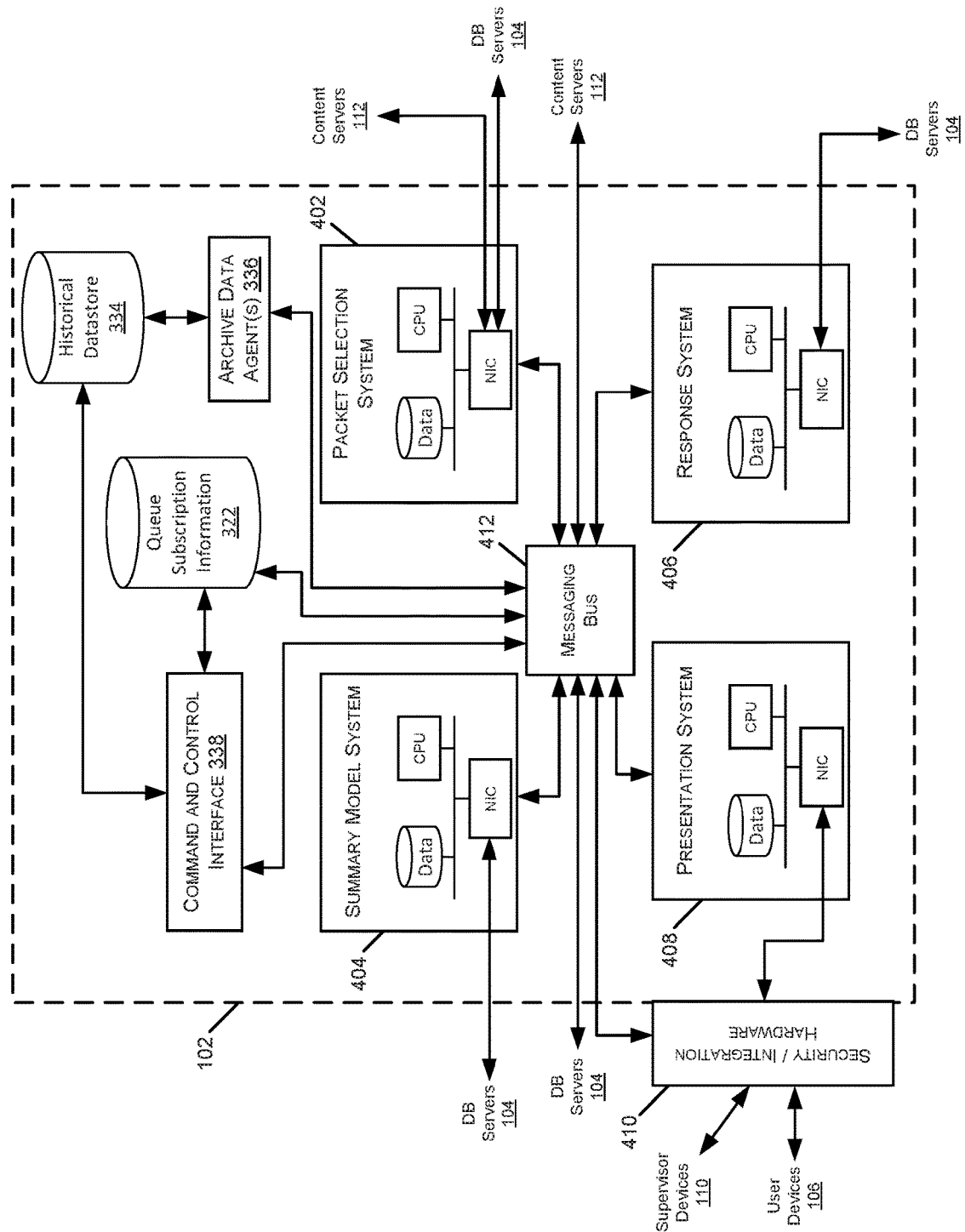
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; form reliability; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can optionally allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 338 various data streams can be selected for archiving into the historical data store 334.

Components of the content distribution network 100 outside of the server 102 can also gather information that is reported to the server 102 in real-time, near real-time, or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribers or just a subset. For example, a component of the content distribution network 100 outside of the server 102 may report a user response, but define an identifier of that user as a private variable that would not be passed to processing subscribers lacking access to that user and/or authorization to receive that user data. Processing subscribers having access to that user and/or authorization to receive that user data would receive the subscriber identifier along with response reported to that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information.

The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. Specifically, in some embodiments, the messaging bus 412 can receive and output information from at least one of the packet selection system, the presentation system, the response system, and the summary model system. In some embodiments, this information can be output according to a "push" model, and in some embodiments, this information can be output according to a "pull" model.

As indicated in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber, if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of message in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. In some embodiments, the internal processing subscribers 402-408 can receive a request for creation of a form, receive filter inputs from the user, provide content components corresponding to the filter inputs to the user, receive selections of content components for inclusion in the form, calculate a reliability of the form, generate recommended changes to the form, store the form, provide the form to a user, receive responses to the provided form, evaluate the responses, generate a score characterizing the received response, update information relevant to the user, generate and provide an intervention or intervention recommendation, and provide the updated information relevant to the user.

The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regards to the components 402-408, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets or content components, for providing to a user. In some embodiments, the recommendation engine can identify one or several content components for removal from a form and/or one or several content components for inclusion in a form. In some embodiments, these one or several content components can be identified based on their impact on the one or several scores or statistical measures characterizing the form.

In some embodiments, for example, the reliability of a form may be too low as compared to a threshold value. In such an embodiment, one or several content components in the form that are responsible for decreasing the reliability of the form can be identified for removal from the form and/or can be removed from the form. Similarly, in some embodiments in which the reliability is too low, one or several content components that are not in the form can be identified for inclusion in the form and/or can be included in the form. In some embodiments, one or several content components identified for inclusion in the form and/or identified for removal from the form can be identified to the creator of the form for confirmation of the removal of those one or several content components from the form and/or for the confirmation of the addition of those one or several content components to the form.

These content components can be selected based on, for example, the information retrieved from the database server 104 including, for example, the user profile database 301, the content library database 303, the model database 309, or the like. In some embodiments, these one or several data packets can be adaptively selected and/or selected according to one or several selection rules, to the determine reliability of a form or draft form, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses or curriculums in training or educational contexts, interactive gaming environments, and the like. For example, the summary model system 404 may query one or more databases and/or data store servers 104 to retrieve user data such as associated content compilations or programs, content completion status, user goals, results, and the like. In some embodiments, the summary model system 404 can generate a model, based on user response data, identifying a user's progress over time in developing a skill, an attribute, or the like. In some embodiments, this can include receiving a raw score generated by, for example, the response system 406 (discussed below), and generating a standardized score from that raw score. In some embodiments, for example, this can include the generation of a T-score from the raw score. In some embodiments, the T-score can be a standardized score that is positive and that has a mean of 50. In some embodiments, the T-score can characterize the number of standard deviations a raw score is above or below a mean. In some embodiments, the T-score can be used to standardize for age, gender, or any other attribute.

A content management server 102 also may include a response system 406, which can include, in some embodiments, a response processor. The response system 406 may be implemented using dedicated hardware within the content distribution network 100 (e.g., a response server 406), or using designated hardware and software resources within a shared content management server 102.

The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100.

The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several responses into one or several observables can include determining whether the one or several responses are correct responses, also referred to herein as desired responses, or are incorrect responses, also referred to herein as undesired responses. In some embodiments, the translation of the one or several responses into one or several observables can include characterizing the degree to which one or several responses are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
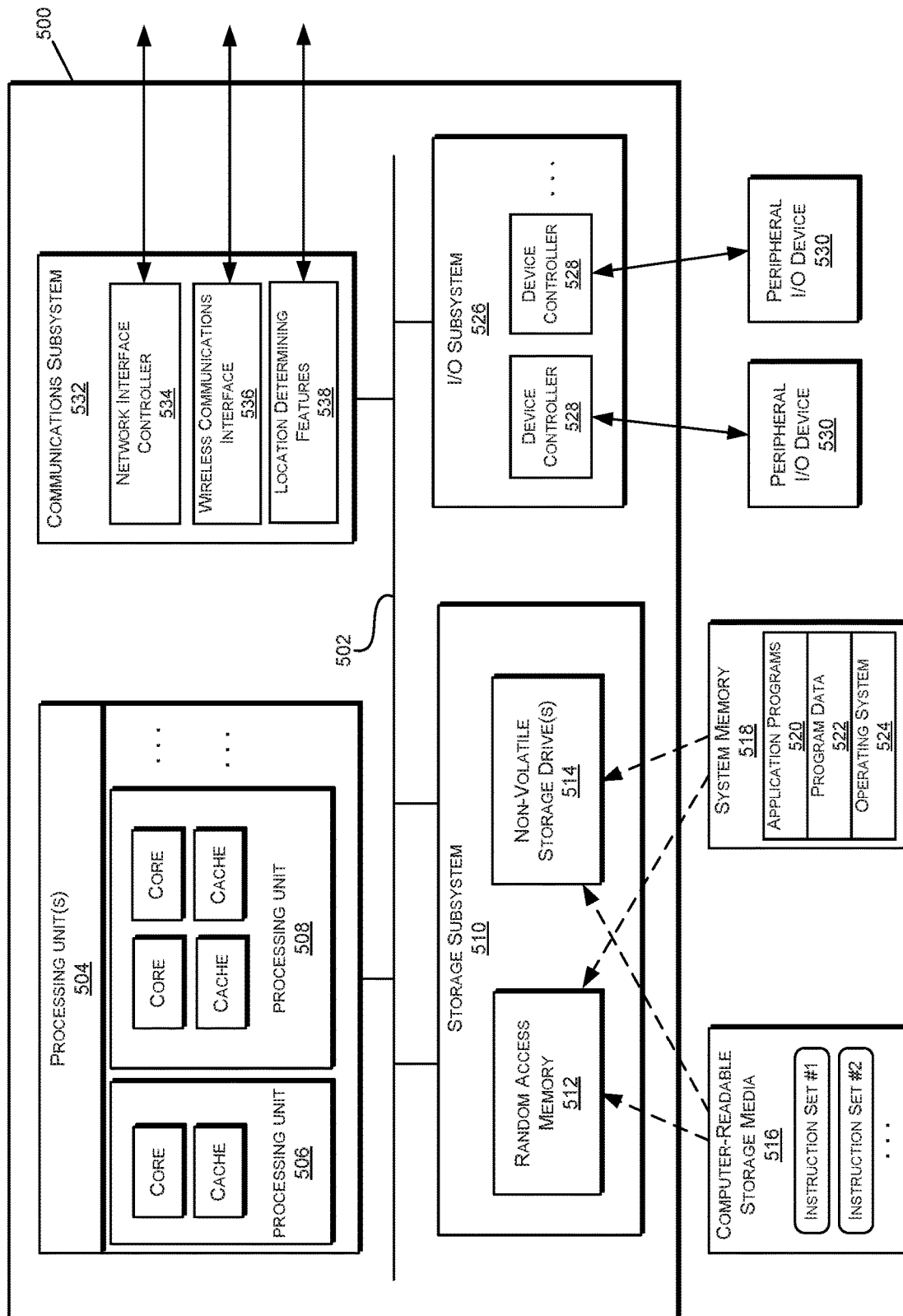
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.)

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
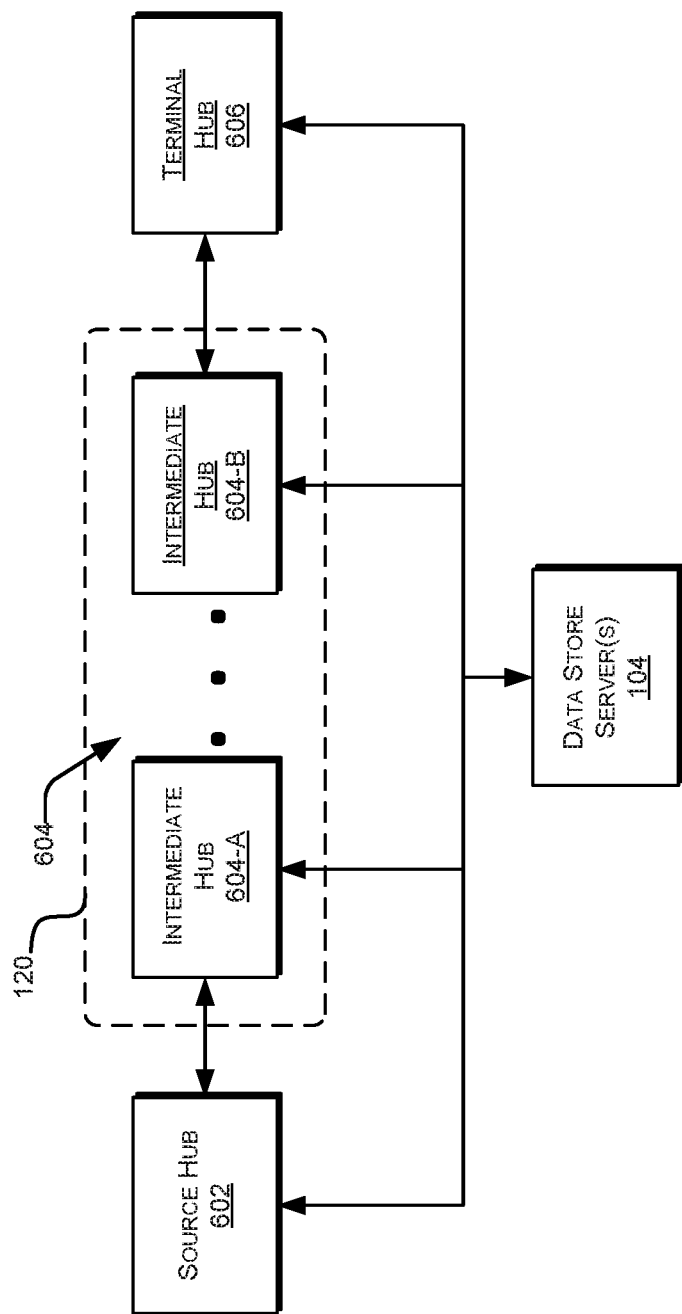
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiment, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
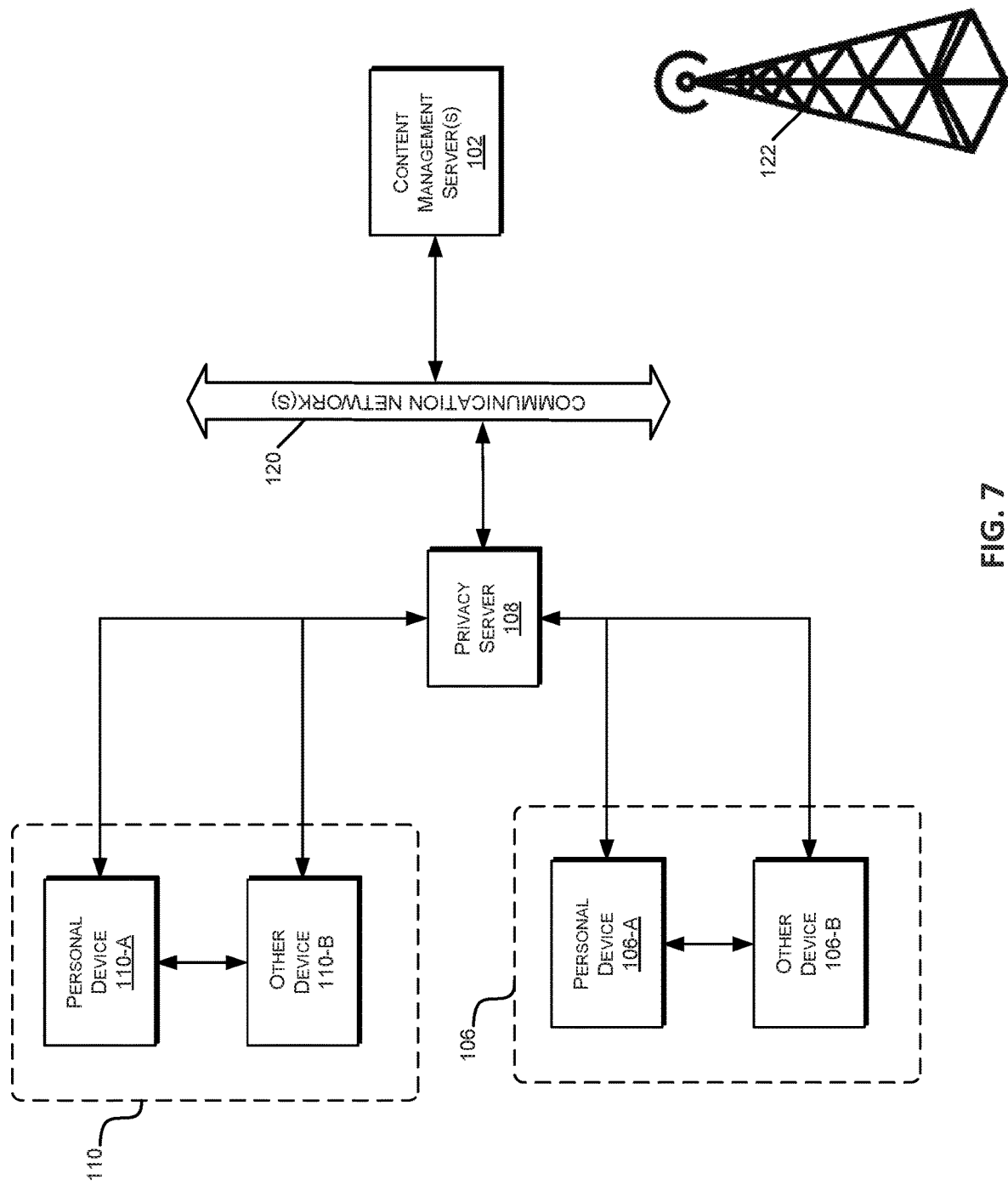
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor devices 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert. In some embodiments, the prompt can comprise an alert configured to trigger activation of the I/O subsystem of a user device 106 of a follow-up user, also referred to herein as a second user device, to provide a notification of the exceeded threshold.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using any other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

With reference now to FIGS. 8-14 diagrams illustrating embodiments of processes for operation of the content distribution network 100 are shown. In some embodiments, one or several these processes can be performed to automatically generate a content grasp and/or knowledge graph based on one or several received content aggregations. As used herein, a content graph comprises a plurality of nodes that are linked by a plurality of edges such that each of the plurality of edges links a pair of nodes. Each of the nodes in the plurality of nodes is associated with a portion of the content aggregation. As used herein, a knowledge graph comprises a plurality of nodes that are linked by a plurality of edges such that each of the plurality of edges links a pair of nodes. Further, a knowledge graph can be a pedagogical graph of instructional skills required to master a body of knowledge. Each of the nodes in the plurality of nodes of a knowledge graph is associated with a skill and content that comprises a portion of the content aggregation for which and/or from which the knowledge graph is created.

In some embodiments, the knowledge graph and/or the content graph can be generated via the application of one or several statistical models to features extracted from the content aggregation. These features can include, for example, the explicit sequencing of content in the content aggregation and/or the implicit sequencing of content in the content aggregation. In some embodiments, the edges within the knowledge graph, and specifically the hierarchical relationships and/or sequential relationships can be identified based on the output of these one or several statistical models. These content graphs and/or knowledge graphs can, in some embodiments, be used in the selection and provisioning of content to a user.

Figure 8:
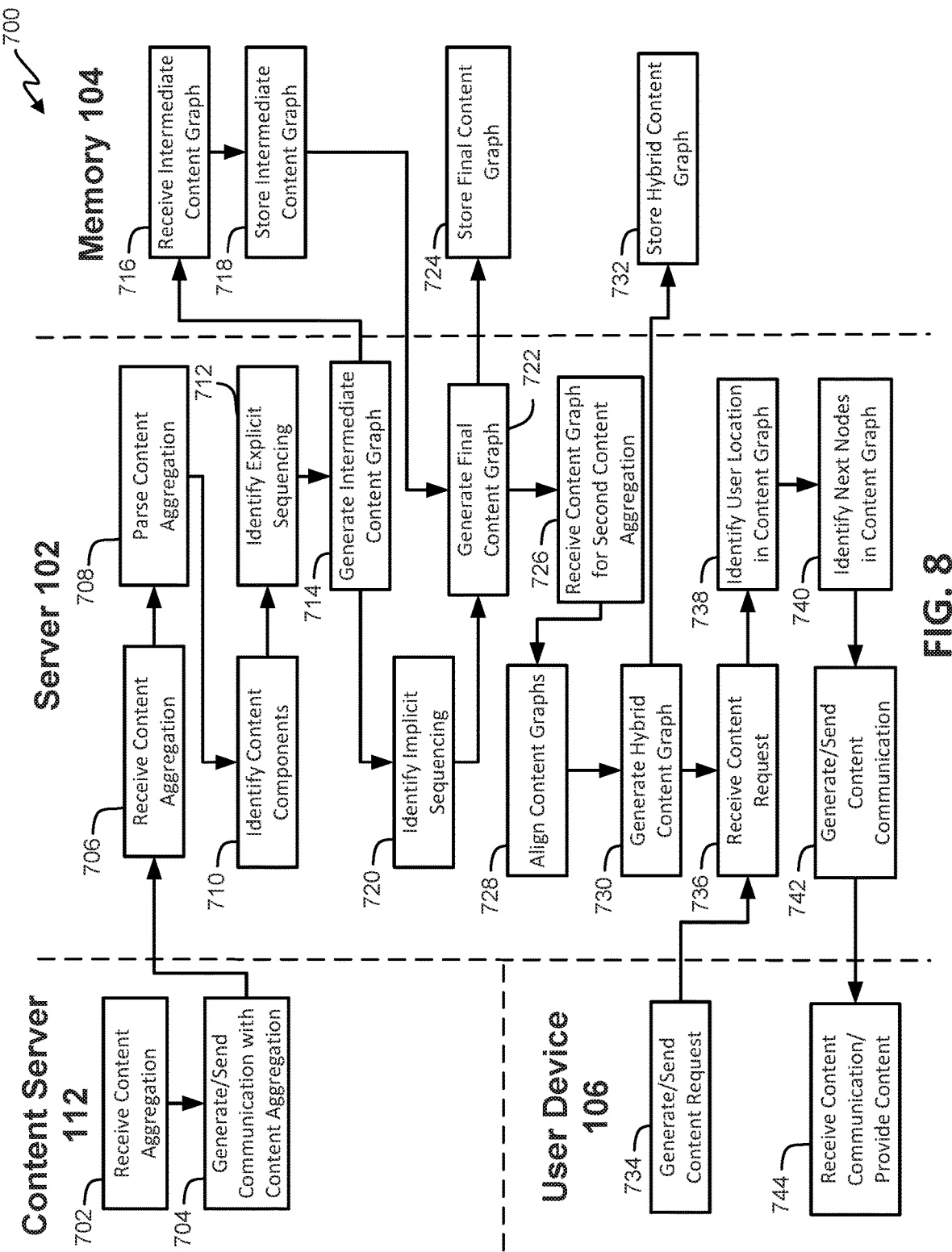
FIG. 8 is swim lane diagram illustrating one embodiment of a content provisioning process according to an automatically generated content graph and/or knowledge graph.

With reference now to FIG. 8, a swim lane diagram illustrating one embodiment of a content provisioning process 700 according to an automatically generated content graph and/or knowledge graph is shown. The process 700 can be performed by all or portions of the content distribution network 100 including, for example, at least one server 102, memory 104, at least one user device 106, and at least one content server 112. The process 700 begins at block 702, wherein at least one content aggregation is received at the content server 112. In some embodiments, the at least one content aggregation can comprise a first content aggregation and a second content aggregation. The content aggregation can be received at the content server 112 from a source of the content aggregation such as, for example, via the internet. After the content aggregation has been received, the process 700 can proceed to block 704, wherein a communication including the content aggregation can be generated by the content server 112 and sent from the content server 112. In some embodiments, the communication can be generated and/or sent by the I/O subsystem 526 of the content server 112.

The communication including the content aggregation can be an electrical communication that can be received by the server 102 as indicated in block 706. At block 708, the content aggregation can be parsed. In some embodiments, this can include the performing of Natural Language Processing (NLP) on all or portions of the content aggregation. The parsing can include, for example, content extraction, word extraction, identification of document structure, parts of speech, extraction of acronyms and abbreviations, extraction of domain-specific terminology, citation extraction, natural language understanding, semantic processing (e.g., information extraction or the extraction of logical triples from parse trees) or any other NLP, including text analytics, action.

After the content aggregation has been parsed, one or several content components can be identified as indicated in block 710. In some embodiments, each of these content components can comprise a portion of the content aggregation, and these components can be identified via one or several NLP processes. At block 712, the explicit sequencing of the content aggregation is determined. In some embodiments, this can include a determination of the sequencing of the content components according to explicit sequencing information extracted from the content aggregation. In some embodiments, this explicit sequencing information can be extracted from the metadata of the content aggregation, which metadata can include, for example, front matter, such as a preface, an introduction, table of contents, or the like.

After the explicit sequencing is identified, the process 700 proceeds to block 714, wherein an intermediate content graph is generated by the at least one server 102. In some embodiments, the intermediate content graph can comprise a plurality of nodes linked by a plurality of edges such that each edge links a pair of nodes from the plurality of nodes. These edges can identify hierarchical relationships and/or sequential relationships between the linked nodes, and specifically, an edge, can include or be associated with an attribute, or information that identifies one of the nodes in the pair of nodes as a parent node and the other node in the pair of nodes as a child node. In some embodiments, edges linking nodes in the hierarchical relationships and/or sequential relationships indicated by those edges can reflect the explicit sequencing identified in block 712. The generated intermediate graph can be sent from the at least one server 102 to the memory 104 via electronic communication. The intermediate graph can be received by the memory 104 as indicated in block 104 and can be stored by the memory 104. In some embodiments, the intermediate graph can be stored in the memory 104 as indicated in block 718. In one of the databases such as, for example, the graph database 311.

At block 720 an implicit sequencing of the content aggregation can be determined. In some embodiments, this implicit sequencing can be determined based on implicit sequencing information extracted from the content aggregation, and specifically from the metadata of the content aggregation. In some embodiments, this metadata can include back matter, such as, for example, one or several indices, appendices, glossaries, concordances, or the like. The implicit sequencing data can be extracted from the metadata according to one or several NLP processes. Implicit sequencing can also be extracted from front matter, such as a preface or forward, which can describe alternate pathways through the material.

After the implicit sequencing has been identified, the process 700 proceeds to block 722 wherein the final content graph is generated. In some embodiments, the generation of the final content graph can include the addition, removal, renaming, or changing of one or several nodes in the intermediate content graph and/or the addition, removal, or changing of one or several edges in the intermediate content graph. In some embodiments, the generation of the final content graph can be performed based on one or all of the explicit sequencing, the implicit sequencing, and rules describing their revisions. After the final content graph has been generated, an electrical communication containing the final content graph can be sent from the at least one server 102 to the memory 104 and the final content graph can be stored in the memory 104 as indicated in block 724. In some embodiments, the final content graph can be stored in one of the databases of the memory 104 such as, for example, the graph database 311.

At block 726, a content graph for a second content aggregation is received. In some embodiments, this content graph can be received from the memory 104 and specifically from one of the databases of memory 104 such as, for example, the graph database 311. In some embodiments, this content graph for the second content aggregation can be generated by the server based on the second content aggregation received from the content server 112. After the second content graph is received, the process 700 can proceed to block 728 wherein the first and second content graphs are aligned. In some embodiments, this alignment can include the determination and/or identification of matching nodes between the first content graph in the second content graph, matching edges, hierarchical relationships, and/or sequential relationships, missing nodes, or the like. This alignment can be performed based on analysis of some or all of the nodes of one or both of the first and second content graphs, and/or the content associated with those nodes.

After the content graphs are aligned, the process 700 proceeds to block 730, wherein a hybrid content graph is generated. In some embodiments, the hybrid content graph and/or hybrid knowledge graph can draw information from multiple content graphs and/or multiple knowledge graphs. In some embodiments, for example, a first content graph and/or first knowledge graph and a second content graph and/or second knowledge graph can be combined to create a hybrid content graph and/or hybrid knowledge graph containing nodes from one or both of the content graphs and/or knowledge graphs and relationships between nodes based on the same. The hybrid content graph can be generated based on the aligning of the content graphs so as to reflect all or portions of the first content graph and the second content graph. In some embodiments, the hybrid graph can represent semantic relationships in the subject matter. In some embodiments, the hybrid graph can represent alternate sequencings of the material suited for different purposes. After the hybrid content graph is generated, the electrical communication comprising the hybrid content graph can be sent from the at least one server 102 to the memory 104 and the hybrid content graph can be stored in the memory 104 and specifically within one of the databases such as the graph database 311 of the memory 104 as indicated in block 732.

At block 734. A content request is generated by a user device 106 and sent from the user device 106 to the server 102. In the form of an electrical communication via the communication network 120. The content request can be received by the server 102 as indicated in block 736, and the location in the content graph of the user associated with the received content request can be identified as indicated in block 738. In some embodiments, this location can be identified based on information associated with that user that can be stored in the memory 104 and specifically within the user profile database 301.

After the user location in the content graph has been identified, the process 700 proceeds to block 740, wherein one or several next nodes in the content graph are identified. In some embodiments, this can include identifying edges connected to the node of the current location of the user in the content graph, identifying prerequisite relationships associated with those edges, and identifying child nodes of the node of the user location as potential next nodes. In some embodiments, these child nodes can be further evaluated to identify any prerequisite relationships amongst the child nodes and/or to identify a preferred path through the child nodes. In some embodiments, one of these child nodes can be selected as the next node.

At block 742. A content communication containing the selected next node is generated by the server and specifically by the I/O subsystem 526 of the server 102 and sent to the user device 106. And block 744, the content communications received by the user device and the received content is provided to the user. In some embodiments, the content communication can comprise code or data configured to automatically trigger a user interface of the user device 106 to display all or portions of the content of the next node in response to receipt of the content communication by the user device 106.

Figure 9:
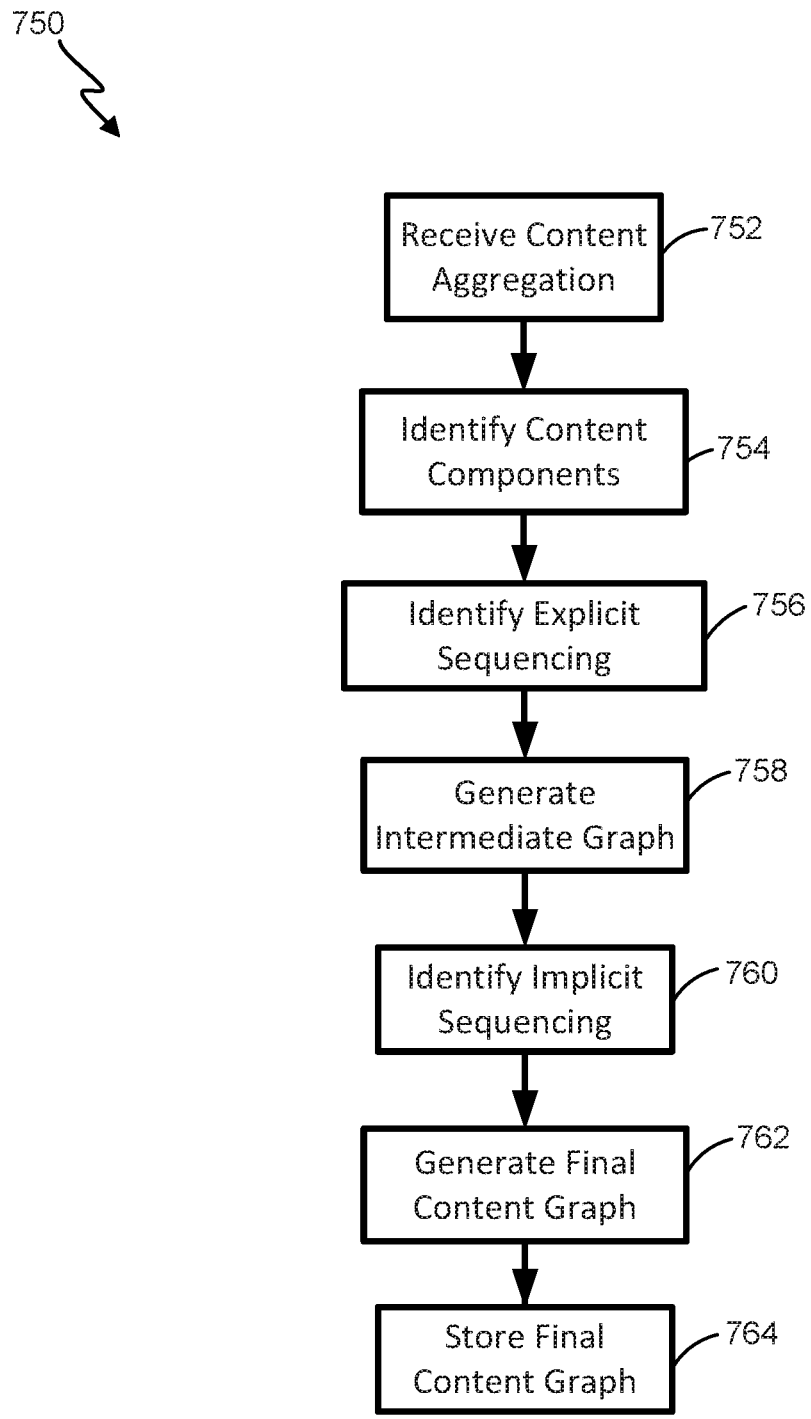
FIG. 9 is a flowchart illustrating one embodiment of a process for generating and storing final content graph.

With reference now to FIG. 9, a flowchart illustrating one embodiment of a process 750 for generating and storing final content graph is shown. The process 750 can be performed by all or portions of the content distribution network 100 including, for example, by at least one server. The process 750 begins a block 752 wherein a content aggregation is received. In some embodiments, the content aggregation can be received by at least one server 102 from, for example, the content server 112, from a user device 106 or supervisor device 110, and/or from the database server 104. After the content aggregation has been received, the process 750 proceeds to block 754 wherein content components of the content aggregation are identified. In some embodiments, this can include the parsing and/or natural language processing of all or portions of the content aggregation including, for example, content of the content aggregation, and/or metadata of the content aggregation. In some embodiments, the identification of one or several content components can be performed based on the metadata of the content aggregation, and specifically front matter of the content aggregation. In one embodiment, for example, the front matter of the content aggregation can comprise a table of contents, which can be parsed to identify one or several chapters, sections, and subsections dividing content within the content aggregation. In some embodiments, the content components can be identified as the smallest segment of content identified within the table of contents. In some embodiments, the identification of content components can include the identification of a name of content components and/or a skill associated with the content components. The content components can be identified by the server 102.

After the content components have been identified, the process 750 proceeds to block 756 wherein the explicit sequencing of the content aggregation is identified. In some embodiments, this can include analysis of all or portions of the content aggregation, including metadata which can, in some embodiments, contain front matter of the content aggregation. In some embodiments, identifying explicit sequencing of the content aggregation, and specifically of the content components identified in block 754 can include extracting explicit sequencing data or information contained within metadata associated with the content aggregation, which metadata can comprise front matter of the content aggregation, such as, for example, one or several prefaces, introductions, tables contents, or the like.

After the explicit sequencing is identified, the process 750 proceeds to block 758, wherein the intermediate content graph is generated. The intermediate content graph can comprise a plurality of nodes that are associated with the content components of the content aggregation identified in block 754. In some embodiments, the intermediate content graph can comprise a plurality of edges linking the nodes in the intermediate content graph with each other. Each of these edges can be linked to nodes in a pair of nodes. In some embodiments, the edges forming the intermediate content graph can further identify a hierarchical relationship and/or a sequential relationship between the notes forming the pair of nodes such that one of the nodes forming the pair of nodes is identifiable as a parent node and the other of the notes forming the pair of nodes is identifiable as a child node. In some embodiments, each of the content components identified in block 754 is associated with unique one of the plurality of nodes forming the content graph. The intermediate content graph can be generated by the server 102.

After the intermediate graph has been generated, the process 750 proceeds block 760 wherein the implicit sequencing of the content aggregation is identified. In some embodiments, this can include analysis of all or portions of the content aggregation, including metadata associated with the content aggregation. This metadata can, in some embodiments, contain all or portions of the content of the content aggregation, and/or all or portions of the back matter and/or the front matter of the content aggregation. In some embodiments, identifying implicit sequencing of the content aggregation, and specifically of the content components identified in block 754 can include extracting implicit sequencing data or implicit sequencing information from the metadata associated with the content aggregation, which metadata can comprise the back matter of the content aggregation, such as, for example, one or several indices, appendices, glossaries, or the like. In some embodiments, identifying implicit sequencing can include the application of one or several NLP processes to the content aggregation and/or to, the metadata of the content aggregation to extract features which can be used in connection with the model to identify relationships between nodes, and thus the implicit sequencing. The implicit sequencing of the content aggregation can be determined by the processor 102.

After the implicit sequencing of the content aggregation has been identified, the process 750 proceeds to block 762 wherein a final content graph is generated. In some embodiments, the generation of the final content graph can be performed based on the explicit sequencing and/or the implicit sequencing. The generation of the content graph can further include modifying one or several attributes of the intermediate content graph, such as, for example, one or several edges of the intermediate content graph and/or one or several nodes of the intermediate content graph. This can include, for example, deleting at least one node, adding at least one node, adding at least one edge, removing at least one edge, changing the directionality of at least one edge, or the like. In some embodiments, these modifications of the intermediate content graph can be performed according to the implicit sequencing identified in block 760.

After the final content graph has been generated, the process 750 proceeds to block 764 wherein the final content graph is stored. In some embodiments, the final content graph can be stored in the database server 104 and specifically within one of the databases of the database server such as, for example, the graph database 311. In some embodiments, the final content graph can be stored and can be linked to the content aggregation, and specifically, the nodes of the final content graph can be linked to content components of the content aggregation. In some embodiments, for example, each node of the final content graph can be associated with the pointer pointing towards the content component of the content aggregation with which that node is associated. In some embodiments, these pointers and/or these links can likewise be stored in the database server 104 and specifically in the graph database 311. In some embodiments, these pointers and/or links can be stored using one or several rich file formats.

Figure 10:
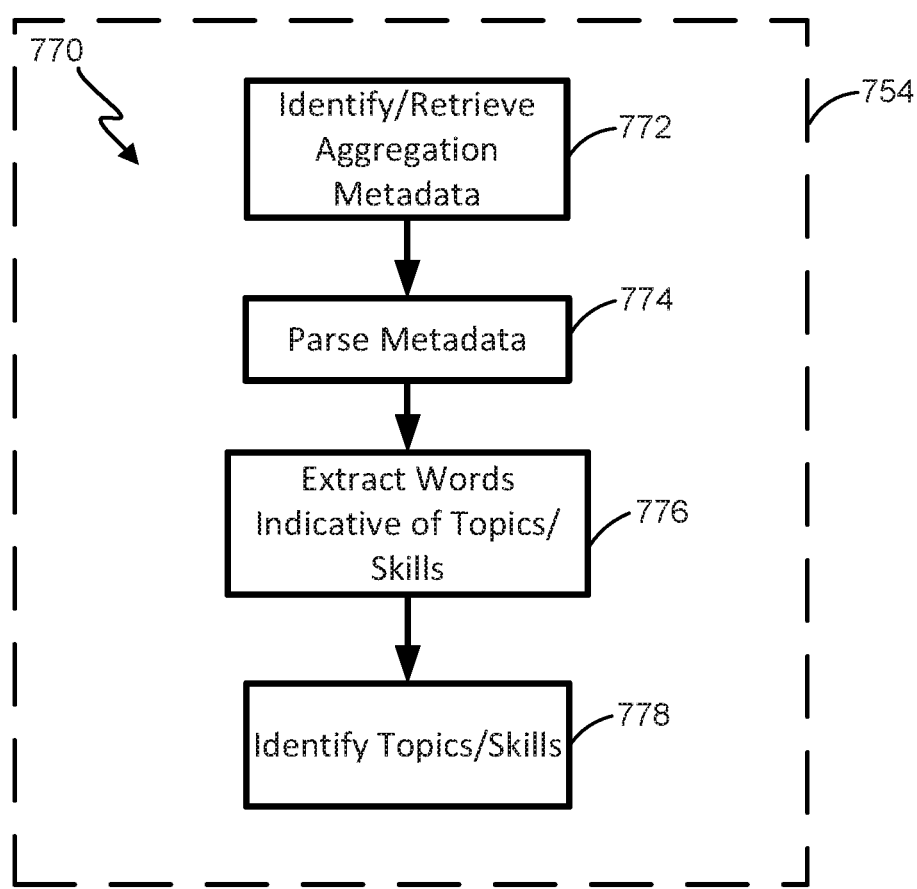
FIG. 10 is a flowchart illustrating one embodiment of a process for identifying content components.

With reference now to FIG. 10, a flowchart illustrating one embodiment of a process 770 for identifying content components is shown. The process 770 can be performed by all or portions of the content distribution network 100 including, for example, the at least one server 102. The process 770 can be performed as a part of, or in the place of the step of block 754 of FIG. 9. The process 770 begins at block 772 wherein metadata associated with the content aggregation is identified and/or retrieved. In some embodiments, the metadata can be identified from within the database server 104 and specifically within one of the databases of the database server 104 such as, for example, the content library database 303. After the aggregation metadata has been retrieved, the process 770 proceeds to block 774 wherein the metadata is parsed. In some embodiments, the parsing of the metadata can include the identifying of one or several words or phrases within the metadata. In some embodiments, the parsing metadata can be performed by the at least one server 102.

After the metadata has been parsed, the process 770 proceeds to block 776, wherein one or several words indicative of topics and/or skills are extracted from the parsed metadata. In some embodiments, this can include the applying of natural language processing to the parsed metadata to extract and/or understand one or several words or phrases within the metadata. In some embodiments, the one or several words or phrases extracted and/or understood from the metadata can be words, and/or phrases indicative of topics or skills. In some embodiments, each topic is uniquely associated with a content component.

After the extraction one or several words indicative of topics or skills, the process 770 proceeds to block 778, wherein one or several topics or skills are identified based on the extracted words. In some embodiments, this can include inputting the extracted words into the machine learning model trained to correlate one or several words with one or several topics that are skills. In some embodiments, this model can then, based on the inputted words, output identification of one or several topics that are skills based on those inputted words.

Figure 11:
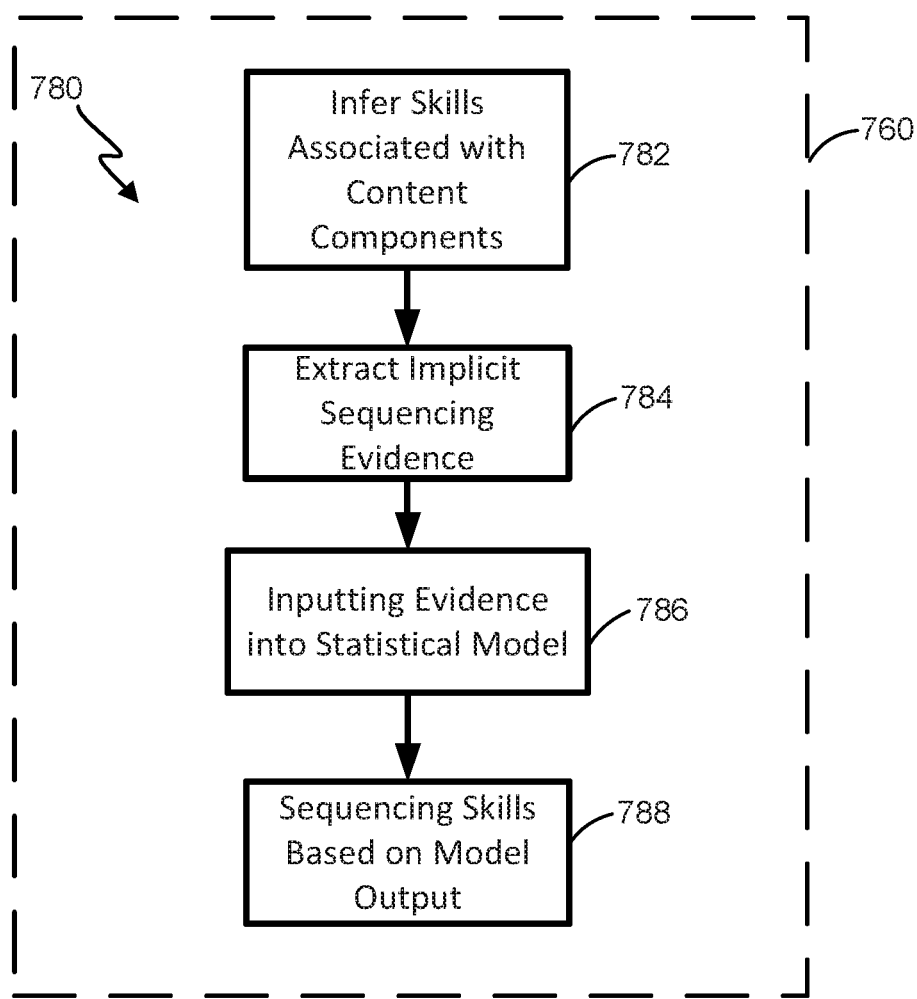
FIG. 11 is a flowchart illustrating one embodiment of a process for identifying implicit sequencing.

With reference now to FIG. 11, a flowchart illustrating one embodiment of a process 780 for identifying implicit sequencing is shown. The process 780 can be performed by all or portions of the content distribution network 100. In some embodiments, the process 780 can be performed as a part of, or in the place of step of block 760 of FIG. 9. The process 780 begins at block 782, wherein one or several skills are inferred as associated with content components of the intermediate content graph. In some embodiments, the inferring of skills associated with content components can include the selection of the content component, the natural language processing of the content of the content component, the inputting of these extracted words, or phrases into a predictive model trained to predict skills based on inputted words, or phrases, and then receiving an output from the predictive model, which output identifies one or several skills. In some embodiments, each of these output skills can be associated with a value indicative of a probability of that outputted skill being found in the content component.

After skills associated with the content components have been inferred, the process 780 proceeds to block 784, wherein implicit sequencing evidence is extracted from the content aggregation and/or from the metadata of the content aggregation. In some embodiments, the implicit sequencing evidence, and/or the implicit sequencing data can be extracted from metadata corresponding to the back matter of the content and aggregation, and specifically corresponding to one or several appendices, glossaries, indices, or the like. In some embodiments, extraction of implicit sequencing evidence can include, for example, the evaluation of the index of the content aggregation to identify topics and/or subtopics contained in one or several content components of the content aggregation. In some embodiments, for example, the order in which topics appear in content components of the content aggregation can implicitly identify a sequence and/or preferred sequence for delivery of the content of the content aggregation. Thus, the earliest introduction of a topic in the content aggregation can implicitly identify a content component intended for provisioning to a user earlier than content components containing subtopics to that topic, or the later mention of that same topic. In some embodiments, the implicit sequencing evidence can be extracted from the content aggregation and/or metadata of the content aggregation, by natural language processing.

After the extraction of implicit sequencing evidence, the process 780 proceeds to block 786, wherein the implicit sequencing evidence is inputted into a model that can be a statistical model. In some embodiments, this model can be based on one or several machine learning principles including, for example, Relational Machine Learning. This model can be trained to identify and/or predict relationships between the nodes of the intermediate content graph based on evidence inputted into the model. This evidence can include the implicit sequencing evidence extracted in block 784, or explicit sequencing evidence identified and/or extracted as a part of the process of FIG. 9.

After the evidence has been inputted into this model, the process 780 proceeds to block 788, wherein the nodes of the content graph, which nodes can be updated to reflect the skills inferred in block 782, thereby converting the content graph to a knowledge graph, can be sequenced based on the output of the model. In some embodiments, for example, the model can output identification of predicted hierarchical relationships and/or sequential relationships between nodes of the content graph and/or knowledge graph. These hierarchical relationships and/or sequential relationships can contribute and/or correspond to the sequencing of the nodes and/or of the skills or content components contained within the content graph and/or knowledge graph. In some embodiments, the sequencing of skills based on the output of the model, can include the generation of edges between nodes, and the association of information and/or identifiers with the edges indicative of the hierarchical relationship and/or the sequential relationship within a pair of nodes.

Figure 12:
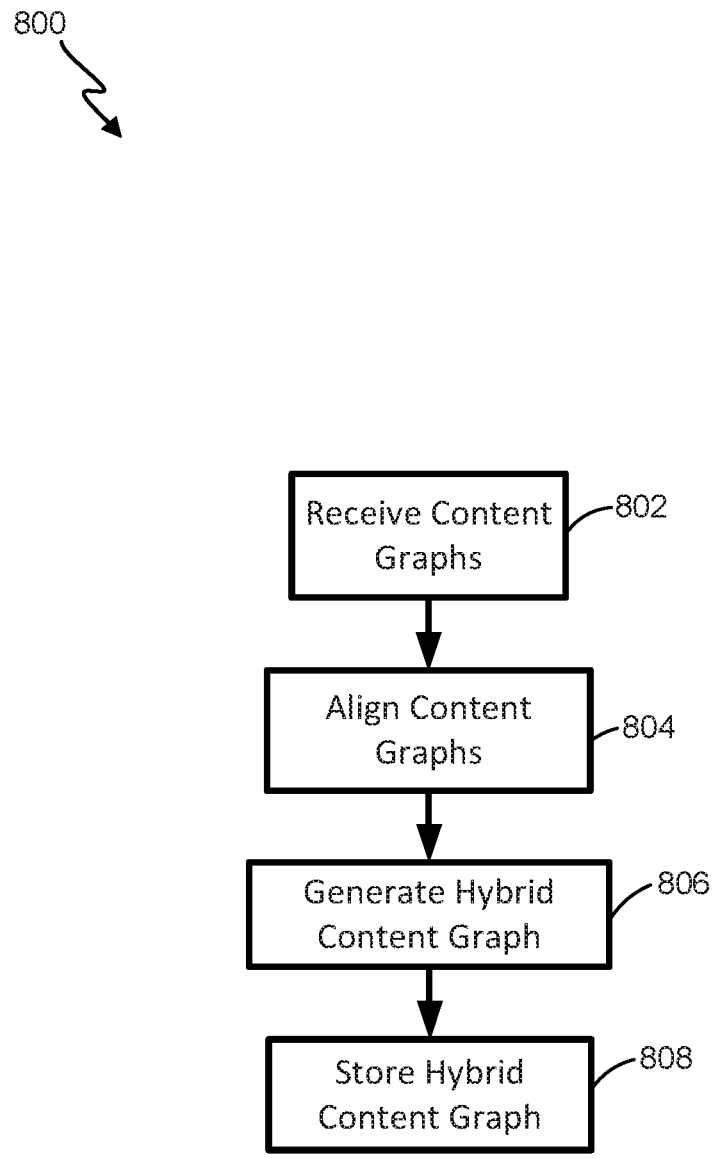
FIG. 12 is a flowchart illustrating one embodiment of a process for generating and storing a hybrid content graph.

With reference now to FIG. 12, a flowchart illustrating one embodiment of a process 800 for generating and storing a hybrid content graph is shown. The process 800 can be performed by the content distribution network 100 and/or by one or several components thereof. The process 800 begins a block 802 wherein a plurality of content graphs, and/or knowledge graphs is received. In some embodiments, the plurality of graphs can include a first graph and a second graph. These graphs can be, for example, intermediate or final graphs. In some embodiments, the graphs can be generated by the server 102 and can be received immediately subsequent to generation, and in some embodiments, the graphs can be received from the database server 104 and specifically from the graph database 311 of the database server 104. The graphs can be received by the server 102.

After the graphs have been received, the process 800 proceeds to block 804, wherein the graphs are aligned. In some embodiments, the graphs can be automatically aligned by the server. In some embodiments, the aligning of the graphs can include analyzing the nodes of the graphs, metadata, including front and/or back matter, associated with the nodes of the graphs, and/or the content associated with the nodes of the graphs. In some embodiments, the nodes and/or the content associated with the nodes of the first and second graphs can be analyzed via natural language processing and/or according to a natural language processing algorithm. This aligning can include, for example, identifying first nodes within the first graph and second nodes within the second graph, identifying matching nodes between the first and second graphs, and identifying nodes contained in one of the first graph, and the second graph that are missing from the other of the first graph in the second graph. The aligning of the graphs can be performed by the server 102.

After the graphs have been aligned, the process 800 proceeds to block 806 wherein a hybrid graph, which can include a hybrid content graph or a hybrid knowledge graph, is generated. The hybrid content graph can comprise a plurality of nodes associated with one or several content components and/or skills, and edges linking the nodes in a hierarchical pairs. In some embodiments, the hybrid content graph can comprise a plurality of nodes which can include the matching nodes contained in both the first and second graphs and at least some of the notes contained in one of the first and second graphs, and missing from the other of the first and second graphs. In some embodiments, the hybrid graph based on a combination of the first graph in the second graph, and specifically based on the aligned first and second graphs.

In some embodiments, generating the hybrid graph can include determining hierarchical relationships and/or sequential relationships between nodes in each of the first and second graphs, and generating hierarchical relationships and/or sequential relationships between the nodes of the hybrid graph. In some embodiments, this can include determining if the sequencing between nodes in the first graph corresponds to sequencing of similar nodes in the second graph. If the sequencing is the same between similar nodes in both the first and second graphs, then the hybrid graph can have the same sequencing between similar nodes. If the sequencing between similar nodes in the first and second graphs is different, then new sequencing for those corresponding nodes in the hybrid graph can be determined. In some embodiments, this new sequencing can be determined according to evidence of explicit and implicit sequencing in each of the first and second graphs, and specifically can be generated and/or determined according to a combination of explicit sequencing and implicit sequencing of content associated with each of the first graph and the second graph. The combination of this evidence can be used to generate sequencing within the hybrid graph via a machine learning model that can be trained to output relationship between nodes and/or sequencing based on inputted evidence. In some embodiments, hybrid hierarchical relationships and/or hybrid sequential relationships can be generated and/or modified based on the output of this model.

After the hybrid graph has been generated, the process 800 proceeds to block 808 wherein the hybrid graph is stored. In some embodiments, the hybrid graph can be stored in the database server 104 and specifically in one of the databases of the database server 104 such as, for example, the graph database 311. In some embodiments, for example, each node of the hybrid graph can be associated with a pointer pointing towards the content component of the content aggregations with which that node is associated. In some embodiments, these pointers and/or these links can likewise be stored in the database server 104 and specifically in the graph database 311.

Figure 13:
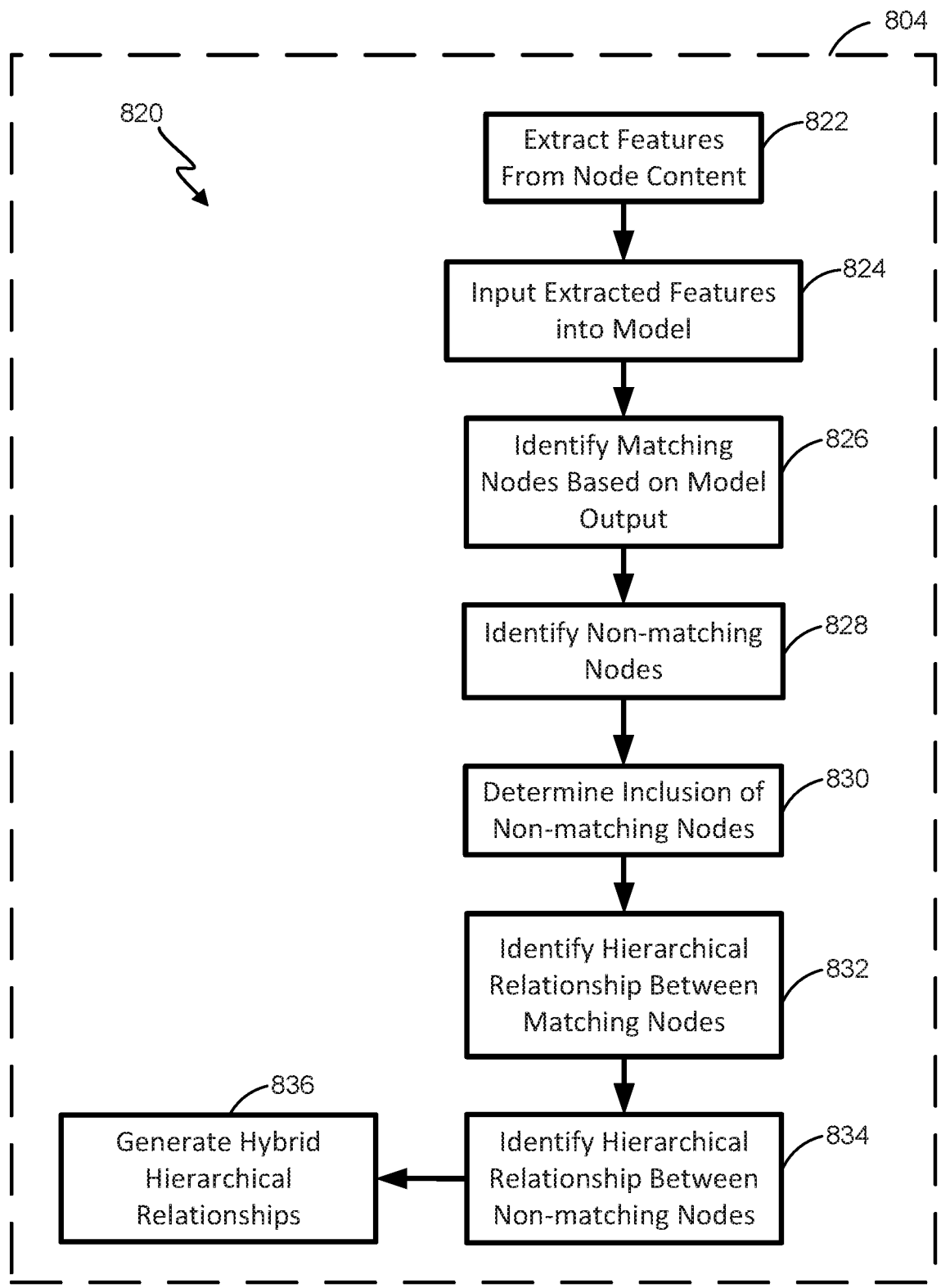
FIG. 13 is a flowchart illustrating one embodiment of a process for aligning content graphs.

With reference now to FIG. 13, a flowchart illustrating one embodiment of a process 820 for aligning content graphs is shown. The process 820 can be performed by all or portions of the content distribution network 100. In some embodiments, the process 820 can be performed as a part of, or in the place of the step of block 804 shown in FIG. 12. The process 820 begins at block 822 wherein features are extracted from node content. In some embodiments, this can include identifying nodes in each of the first and second graphs, selecting a node, identifying a content and/or metadata associated with that node, and analyzing the content and/or metadata associated with that node to identify and extract features. In some embodiments, this feature extraction can include natural language processing of the content associated with the node and/or the metadata associated with the node. In some embodiments, for example, natural language processing can be performed to identify words or phrases indicative of one or several topics associated with the node and/or one or several skills associated with the node. In some embodiments, the extraction of features can include analysis of one or both of the front and back matter relevant to the node. In some embodiments, the step of block 822 can be repeated until features have been extracted for some or all of the nodes in the plurality of graphs from which a hybrid graph is being generated. Features can be extracted from the node by the at least one server 102.

After features are extracted from the node, the process 820 proceeds to block 824 wherein the extracted features are inputted into a model. In some embodiments, this model can comprise a machine learning-based model that can be trained to match nodes between graphs, according to the inputted features. In some embodiments, for example, nodes, and features of those nodes from the first graph can be inputted into the model as well as nodes and features of those nodes from the second graph. The model can then, based on these features and previous training, identify which, if any, of the nodes from the first graph match and/or correspond to one or several nodes of the second graph, or of any additional graphs. In some embodiments, the model can be based on Relational Machine Learning and/or can apply Relational Machine Learning techniques or algorithms to identify the matching nodes. The model can output information indicating matching nodes, which information can be used to identify matching nodes as indicated in block 826. In some embodiments, the model output can identify a plurality of pairs of potential matching nodes and identify the probability or certainty measure for each of those pairs of potential matching nodes being actual matching nodes. In some embodiments, the pairs of potential matching nodes having the highest probabilities of being actual matching nodes can be identified as matching nodes.

After the matching nodes are identified, the process 820 proceeds to block 828 wherein nonmatching nodes are identified. In some embodiments, this can be performed based on the model output, which can, in some embodiments, explicitly identify nonmatching nodes. In some embodiments, the nonmatching nodes can be identified by identifying the set of nodes in each of the first and second content graphs, and eliminating the matching nodes from that set, thus leaving only the nonmatching nodes. In some embodiments, the nonmatching nodes can be identified by the server 102.

After the nonmatching nodes have been identified, the process 820 proceeds to block 830, wherein inclusion of nonmatching nodes in the hybrid graph is determined. In some embodiments, this can include analysis of the metadata of the graphs from which the hybrid graph is being generated to identify features indicative of importance of the nonmatching nodes in the graph in which they are included. In some embodiments, for example, a nonmatching node may relate to one or several skills or present content relevant to completion of one or several child skills. In some embodiments, the importance of the nonmatching node can be determined by identifying edges extending from the nonmatching node to any child nodes and thus determining whether the nonmatching node is a parent node. Additionally, in some embodiments, the determination of whether to include the nonmatching nodes in a hybrid graph can include evaluating the graph that did not include the node, and specifically intermediate graphs of the graph, not including the node, to determine if a matching node existed in an intermediate graph and if so to ascertain the reason for removal of that node from the final graph. In some embodiments, if it is determined that the content or knowledge represented by the omitted node is a prerequisite to the content or knowledge represented by other nodes in the content graph containing the nonmatching node, then the nonmatching node can be included in the hybrid graph.

After the determination of inclusion of nonmatching nodes, the process 820 proceeds to block 832 wherein hierarchical relationships and/or sequential relationships between matching nodes is identified, and to block 834 wherein hierarchical relationships and/or sequential relationships between nonmatching nodes is identified. In some embodiments, this can include the identification of pairs of nodes for linking and the determination of the hierarchical relationship and/or the sequential relationship between those nodes. In some embodiments, this can include, for matching nodes, the identification of node pairings from the first and second graphs, and the identification of which of the nodes from those pairings is the child and which is the parent. For nonmatching nodes, this can include identifying nodes with which the nonmatching node was connected in the graph containing the nonmatching node in the hierarchy within those connections. These hierarchical relationships and/or sequential relationships can be identified or determined by the at least one server 102.

After the hierarchical relationships and/or sequential relationships have been identified, the process 820 proceeds to block 836, wherein hybrid hierarchical relationships and/or sequential relationships are generated. In some embodiments, these hybrid hierarchical relationships and/or sequential relationships can correspond to the hierarchical relationships and/or sequential relationships identified in block 832, and 834. Specifically, in instances of matching nodes in the graphs from which the hybrid graph were created have matching hierarchical relationships and/or sequential relationships, then those matching hierarchical relationships and/or sequential relationships can be re-created as hybrid hierarchical relationships and/or sequential relationships. In some embodiments, the hybrid hierarchical relationships and/or sequential relationships can be generated via the features extracted in, for example, block 822. In some embodiments, these features, as well as the hierarchical relationships and/or sequential relationships identified in blocks 832, 834 can be inputted into a model which can provide, as an output, a sequence of the nodes including the matching and the nonmatching nodes. In some embodiments, for example, the model can output identification of predicted hierarchical relationships and/or sequential relationships between nodes of the graph. These hierarchical relationships and/or sequential relationships can correspond to the sequencing of the nodes and/or of the skills or content components contained within the content graph and/or knowledge graph. In some embodiments, the sequencing of skills based on the output of the model, can include the generation of edges between nodes, and the association of information and/or identifiers with the edges indicative of the hierarchical relationship and/or the sequential relationship within a pair of nodes.

Figure 14:
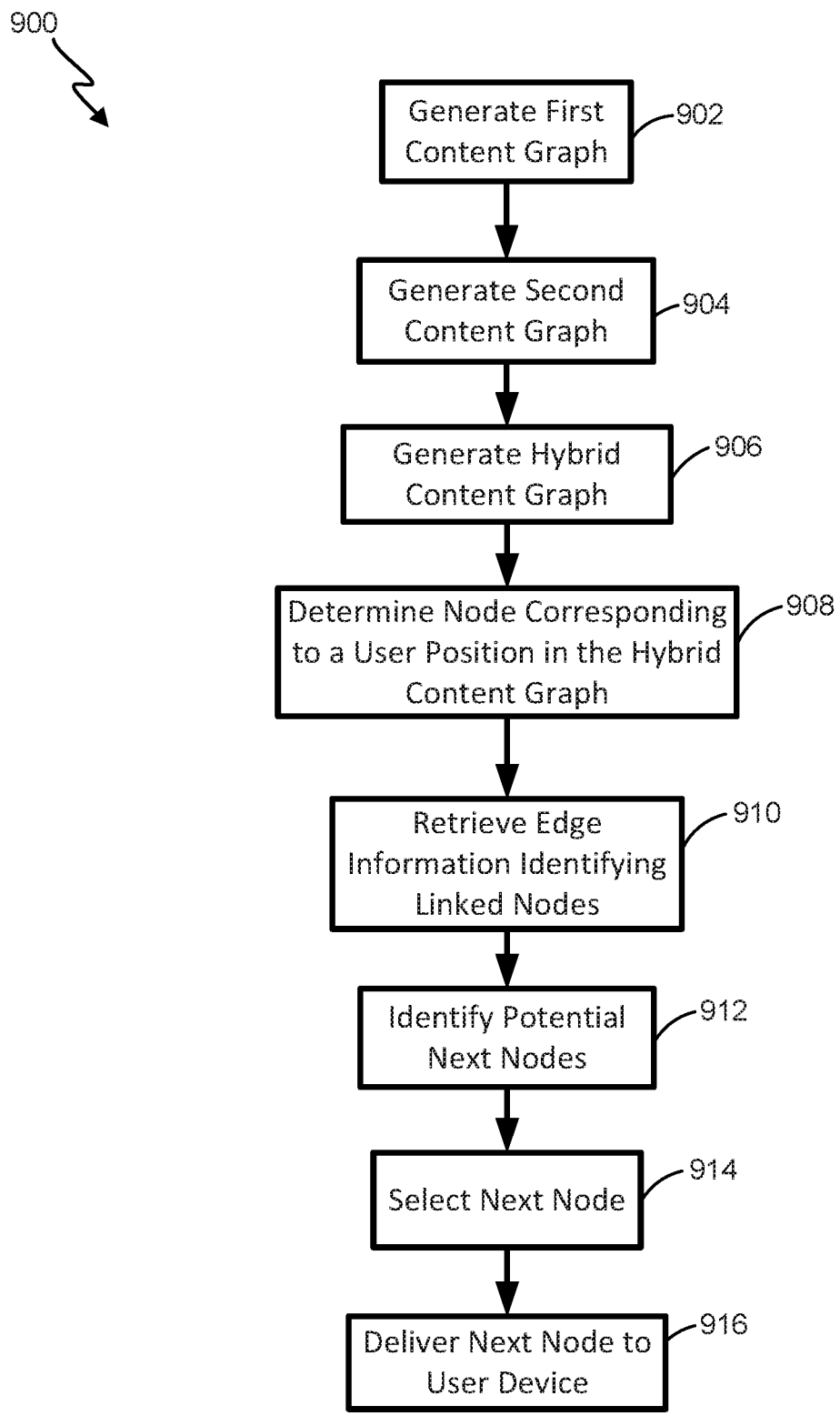
FIG. 14 is a flowchart illustrating one embodiment of a process for content provisioning according to a hybrid graph.

With reference now to FIG. 14, a flowchart illustrating one embodiment of a process 900 for content provisioning according to a hybrid graph is shown. The process 900 can be performed by all or portions of the content distribution network 100. The process begins at block 902, wherein a first graph, which can be a first content graph or a first knowledge graph is generated. In some embodiments, the first graph can be generated by the server 102 according to the steps of process 750 shown in FIG. 9. This can include the receiving of the content component, the analyzing of metadata of the content component to identify explicit sequencing, the generation of an intermediate content graph, the identification of implicit sequencing based on further analysis of the metadata, the identification of one or several skills associated with the content components, and the generation of a final graph based on the application of the implicit sequencing to the explicit sequencing and/or to the intermediate graph. The first graph can identify content components and/or skills and hierarchical relationships and/or sequential relationships between the content components and/or skills from the first content aggregation via application of a machine learning algorithm to features generated from portions of the first content aggregation.

Generating the first graph can include identifying content components based on information contained in the table of contents of the content aggregation and extracting explicit sequencing data from the table of contents in the form of a breakdown of the content aggregation into chapters, sections, sub-sections, etc. Generating the first graph can include generating an intermediate graph based on the explicit sequencing data, utilizing key words and/or phrases extracted from the content components and/or the front or back matter to identify one or several skills associated with the content components. Generating the first graph can further include identifying implicit sequencing based on information extracted from the back matter including from the index, glossary, appendix, or the like and generating a final graph which can be either a content graph having content components associated with nodes or a knowledge graph having skills associated with nodes. This final graph can have a sequencing that is based on a combination of the explicit and implicit sequencing. The first graph can be generated by the server 102.

At block 904, the second graph can be generated or received. In some embodiments, the second graph can be generated by the server 102 according to the steps of process 750 shown in FIG. 9 or according to the description with respect to block 902 above. The second graph can identify content components and/or skills, hierarchical relationships, and/or sequential relationships between the content components and/or skills from the second content aggregation via application of a machine learning algorithm to features generated from portions of the second content aggregation. The second graph can be generated and/or received by the server 102.

After the second graph has been generated, the process 900 proceeds to block 906, wherein a hybrid graph is generated. The hybrid graph can be generated from the first and second graphs generated in blocks 902 and 904. Specifically, the hybrid graph can be generated by aligning the first and second graphs. In some embodiments, the hybrid graph can be generated according to process 800 shown in FIG. 12. The hybrid graph can be generated by the server 102.

After the hybrid graph has been generated, the process 900 proceeds to block 908, wherein a node corresponding to a user position in the hybrid graph is determined. This can include, in some embodiments, determining the node most recently successfully completed by the user. In some embodiments, for example, a user can begin traversing all or portions of the hybrid graph, subsequent to the generation of a hybrid graph. This can be performed via the presentation of content associated with one or several nodes of the hybrid graph to the user and the receipt of a communication from the user device 106, indicating one or several user actions and/or the successful consumption of content by the user, which content is associated with one or several nodes of the hybrid graph. In some embodiments, and after the user has begun traversing the hybrid graph, a request for next content can be received from the user, and specifically from the user device 106 by the server 102. In response to this request, the server 102 can determine the user's location within the hybrid graph and/or can determine a node corresponding to the user's location within the hybrid graph. In some embodiments, this can include retrieving user metadata from the user profile database 301 of the database server, which user metadata can identify the location of the user within the hybrid graph.

After the node corresponding to user position in the hybrid graph has been determined, the process 900 proceeds to block 910 wherein edge information associated with the node corresponding to the user position hybrid graph is retrieved. In some embodiments, this edge information can be retrieved from the database server 104 and specifically from the graph database 311. This edge information can identify nodes directly linked to the node corresponding to the user position in the hybrid graph. In some embodiments, this edge information can further identify child nodes of the node corresponding to user position in the hybrid graph. This edge information can be retrieved by the server 102.

After the edge information has been retrieved, the process 900 proceeds to block 912 wherein one or several potential next nodes are identified. In some embodiments, the potential next nodes can be any one or several child nodes linked directly to the node corresponding to the position of the user in the hybrid network. As used herein, a node is directly linked to another node when a single edge connects those two nodes. After potential next nodes of the identified, the process 900 proceeds to block 914 wherein a next node is selected. In some embodiments, the next node can be selected by identifying a preferred path through the potential next nodes. This preferred path can, as discussed above, be indicated via a value identifier associated with one or several edges extending from the node corresponding to the user location in the hybrid graph. In some embodiments, the next node can be selected via a comparison of the difficulty level of a potential next node to a user skill level. This can include retrieving user metadata from the user profile database 301 and metadata associated with the content of the potential next nodes in the content library database 303. This metadata can be inputted into a recommendation engine that can determine a probability of the user correctly responding to the content and/or successfully consuming the content. Of potential next nodes, the node having the most desired probability can be selected as the next node. The selection of the next node can be performed by the server 102.

After the next node has been selected, the process 900 proceeds to block 916, wherein the next node is delivered to the user device. In some embodiments, this can include the generation of one or several electrical communications, which can include the next node and/or the content associated with the next node as payload of the communication. This communication can be generated and sent from the server 102, and specifically from the communication subsystem 532 of the server 102 via the communication network 122. The user device 106 from which the content request was received. The user device 106 can receive these one or several electrical communications via the communications subsystem 532 of the user device. The user device can then provide the content of these one or several electrical communications to the user of the user device via, for example, the I/O subsystem 526. In some embodiments, the content communication can comprise code configured to automatically trigger a user interface of the user device 106 to display all or portions of the content of the next node. In response to receipt of the content communication by the user device 106.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein, the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for generating a hybrid knowledge graph database, the system comprising:
   memory comprising:
      a content library database comprising at least one content aggregation for presentation to a user;
      a graph database comprising:
         a first content graph; and
         a second content graph; and
   at least one server, wherein the at least one server is configured to:
      receive the first content graph and the second content graph, each of the first content graph and the second content graph comprising a pedagogical graph comprising a plurality of nodes organized in sequential relationships;
      align the first content graph and the second content graph according to a machine learning algorithm, wherein aligning comprises:
         identifying nodes contained in one of the first and second content graphs and missing in the other of the first and second content graphs; and
      generate a hybrid content graph based on the aligned first and second content graphs, wherein generating the hybrid content graph comprises generating sequential relationships between the nodes in the hybrid content graph according to a combination of an explicit sequencing and an implicit sequencing of content associated with each of the first content graph and the second content graph, wherein the implicit sequencing is determined based on metadata comprising at least one of: back matter; and front matter.

2. The system of claim 1, wherein the hybrid content graph comprises a plurality of nodes and a plurality of edges, and wherein each of the edges links a pair of nodes from the plurality of nodes in a sequential relationship.

3. The system of claim 2, wherein aligning the first content graph and the second content graph further comprises identifying matching nodes between the first content graph and the second content graph.

4. The system of claim 3, wherein the plurality of nodes in the hybrid content graph comprise the matching nodes and at least some of the nodes contained in one of the first and second content graphs and missing in the other of the first and second content graphs.

5. The system of claim 4, wherein at least some of the sequential relationships between the nodes in the hybrid content graph are different than the sequential relationship between corresponding nodes in one or both of the first and second content graphs.

6. The system of claim 5, wherein aligning the first content graph and the second content graph comprises analyzing nodes in the first and second content graphs and content associated with those nodes.

7. The system of claim 6, wherein the nodes and content associated with the nodes of the first and second content graphs are analyzed according to a natural language processing algorithm.

8. The system of claim 7, wherein content associated with the nodes of the first and second content graphs comprises front matter.

9. The system of claim 1, wherein the at least one server is further configured to recommend content to a user based on a user position in the hybrid content graph and an attribute of the user, wherein recommending content comprises:
- identifying a node in the hybrid content graph corresponding to the user position in the hybrid content graph, wherein the identified node corresponding to the user position in the hybrid content graph is linked to a plurality of nodes;
- selecting one of the plurality of nodes linked to the node corresponding to the user position in the hybrid content graph; and
- delivering content associated with the selected one of the plurality of nodes to the user.

10. The system of claim 1, wherein aligning the first content graph and the second content graph according to a machine learning algorithm comprises: extracting features from content associated with each of the nodes of the first and second content graphs; inputting the extracted features into a machine learning model; and receiving an output from the machine learning model identifying matching nodes between the first and the second content graphs.

11. A method for generating a hybrid knowledge graph database, the method comprising:
- receiving a first content graph and a second content graph, each of the first content graph and the second content graph comprising a pedagogical graph comprising a plurality of nodes organized in sequential relationships;
- aligning the first content graph and the second content graph according to a machine learning algorithm, wherein aligning comprises identifying nodes contained in one of the first and second content graphs and missing in the other of the first and second content graphs; and
- generating a hybrid content graph based on the aligned first and second content graphs, wherein generating the hybrid content graph comprises generating sequential relationships between the nodes in the hybrid content graph according to a combination of an explicit sequencing and an implicit sequencing of content associated with each of the first content graph and the second content graph, wherein the implicit sequencing is determined based on metadata comprising at least one of: back matter; and front matter.

12. The method of claim 11, wherein the hybrid content graph comprises a plurality of nodes and a plurality of edges, and wherein each of the edges links a pair of nodes from the plurality of nodes in a sequential relationship.

13. The method of claim 12, wherein aligning the first content graph and the second content graph further comprises identifying matching nodes between the first content graph and the second content graph.

14. The method of claim 13, wherein the plurality of nodes in the hybrid content graph comprise the matching nodes and at least some of the nodes contained in one of the first and second content graphs and missing in the other of the first and second content graphs.

15. The method of claim 14, wherein at least some of the sequential relationships between the nodes in the hybrid content graph are different than the sequential relationships between corresponding nodes in one or both of the first and second content graphs.

16. The method of claim 15, wherein aligning the first content graph and the second content graph comprises analyzing nodes in the first and second content graphs and content associated with those nodes.

17. The method of claim 16, wherein the nodes and content associated with the nodes of the first and second content graphs are analyzed according to a natural language processing algorithm.

18. The method of claim 11, further comprising recommending content to a user based on a user position in the hybrid content graph and an attribute of the user, wherein recommending content comprises:
- identifying a node in the hybrid content graph corresponding to the user position in the hybrid content graph, wherein the identified node corresponding to the user position in the hybrid content graph is linked to a plurality of nodes;
- selecting one of the plurality of nodes linked to the node corresponding to the user position in the hybrid content graph; and
- delivering content associated with the selected one of the plurality of nodes to the user.

19. The method of claim 13, wherein aligning the first content graph and the second content graph according to a machine learning algorithm comprises: extracting features from content associated with each of the nodes of the first and second content graphs; inputting the extracted features into a machine learning model; and receiving an output from the machine learning model identifying matching nodes between the first and the second content graphs.

20. The method of claim 19, wherein aligning the first content graph and the second content graph according to a machine learning algorithm further comprises: identifying sequential relationships between the identified matching nodes, wherein the sequential relationships between the identified matching nodes are identified via a Relational Machine Learning analysis.

* * * * *